US012596495B2

(12) United States Patent

Zainuddin et al.

(10) Patent No.: US 12,596,495 B2

(45) Date of Patent: Apr. 7, 2026

(54) POWER SAVING DURING OPEN BLOCK READ WITH LARGE BLOCK OPENNESS

(71) Applicant: Western Digital Technologies, Inc., San Jose, CA (US)

(72) Inventors: Abu Naser Zainuddin, San Ramon, CA (US); Xiang Yang, Santa Clara, CA (US); Jiahui Yuan, Fremont, CA (US); Deepanshu Dutta, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 203 days.

(21) Appl. No.: 18/389,439

(22) Filed: Nov. 14, 2023

(65) Prior Publication Data

US 2025/0156095 A1 May 15, 2025

(51) Int. Cl.
 *G06F 3/06* (2006.01)

(52) U.S. Cl.
 CPC ............ *G06F 3/064* (2013.01); *G06F 3/0604* (2013.01); *G06F 3/0679* (2013.01)

(58) Field of Classification Search
 CPC ....... G06F 3/064; G06F 3/0604; G06F 3/0679
 See application file for complete search history.

(56) References Cited

U.S. PATENT DOCUMENTS

| 9,690,654 | B2 | 6/2017 | No et al. |
| 10,262,743 | B2 | 4/2019 | Alrod et al. |
| 10,861,537 | B1 | 12/2020 | Lien et al. |
| 10,902,925 | B1 | 1/2021 | Lien et al. |
| 11,189,337 | B1 | 11/2021 | Lien et al. |
| 11,404,127 | B1 | 8/2022 | Kumar et al. |
| 2020/0219569 | A1* | 7/2020 | Lee ......................... G11C 16/26 |
| 2021/0280264 | A1* | 9/2021 | Ramachandran Nair .................... G11C 16/3431 |
| 2022/0254416 | A1* | 8/2022 | Kumar ............... G11C 16/3459 |
| 2023/0223084 | A1* | 7/2023 | Lien ....................... G11C 16/08 365/203 |
| 2024/0212737 | A1* | 6/2024 | Moon ................. G11C 11/4087 |

(Continued)

OTHER PUBLICATIONS

U.S. Appl. No. 63/434,191, Word Line-Dependent Word Line and Channel Read Setup Time in First Read State of Non-Volatile Memory, Dong-il Moon et al., Dec. 21, 2022.

(Continued)

*Primary Examiner* — Jerome Leboeuf

(74) *Attorney, Agent, or Firm* — Dickinson Wright PLLC

(57) ABSTRACT

A memory apparatus includes memory cells connected to word lines and operable in one of a first read condition in which a word line voltage of the word lines is discharged and a second read condition in which the word line voltage of the word lines is coupled up to a residual voltage level. A control means is coupled to the word lines and is configured to program the memory cells in a program operation. Following programming of the memory cells connected to specific ones of the word lines, the control means is also configured to apply a predetermined dummy read voltage to the specific ones of the word lines during a dummy read operation to maintain the memory cells connected thereto in the second read condition, the specific ones of the word lines determined based on an amount of the memory cells that are programmed.

17 Claims, 25 Drawing Sheets

(56)        References Cited

U.S. PATENT DOCUMENTS

2024/0221836 A1 *   7/2024   Lee ................... G11C 16/0433

OTHER PUBLICATIONS

U.S. Appl. No. 63/446,098, Variable Read Method for Read Time Performance Improvement of Non-Volatile Memory, Albert Chen et al., Feb. 16, 2023.

U.S. Appl. No. 63/472,474, Automatic Bit Line Voltage and Bit Line Voltage Temperature Compensation Adjustment for Non-Volatile Memory Apparatus Current Consumption Reduction, Albert Chen et al., Jun. 12, 2023.

U.S. Appl. No. 63/521,290, Open Block Detection Method Using for First and Second Time Period Read Time Valley for Non-Volatile Memory Apparatus, Albert Chen et al., Jun. 15, 2023.

* cited by examiner

FIG. 11C
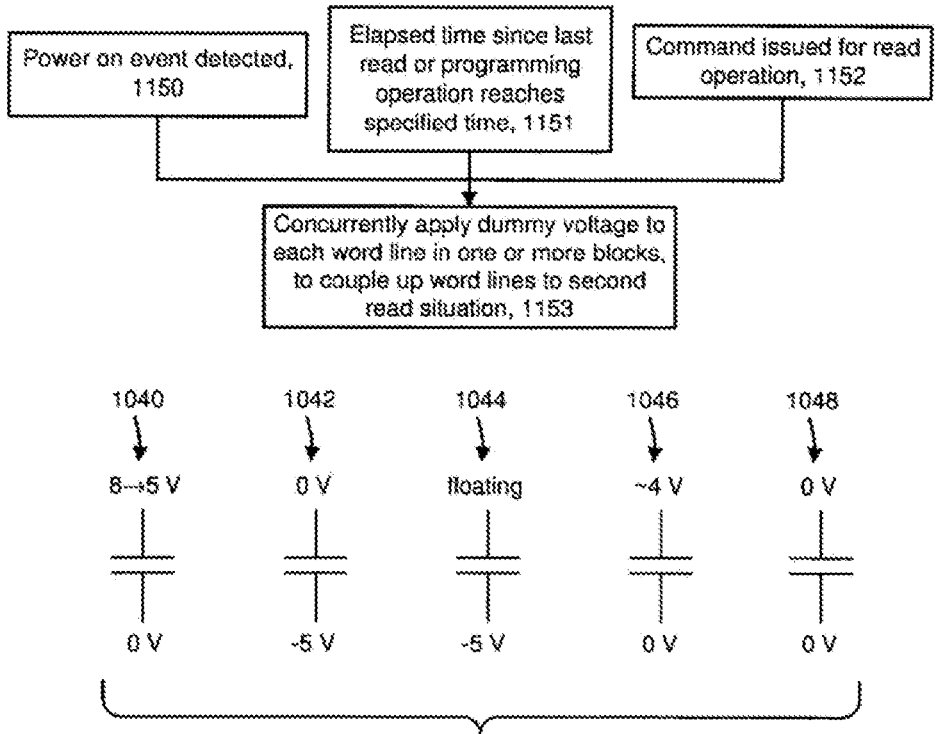
| Power on event detected, 1150 | Elapsed time since last read or programming operation reaches specified time, 1151 | Command issued for read operation, 1152 |
Concurrently apply dummy voltage to each word line in one or more blocks, to couple up word lines to second read situation, 1153
1040     1042     1044     1046     1048
8→5 V    0 V    floating    ~4 V    0 V
0 V     -5 V     -5 V     0 V     0 V
FIG. 12
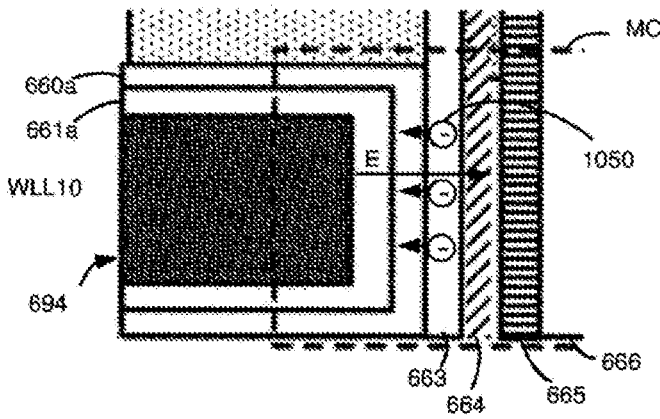
660a
661a
WLL10
694
MC
E
1050
663
664
665
666
FIG. 13

PROGRAMMED LOGICAL WL0
READ LOGICAL WL0
PROGRAMMED ALL WLs
READ LOGICAL WL0

PAGE 1

PAGE 2

PAGE 3

TIME

ICC [a.u.]

PROGRAMMED LOGICAL WL0
READ LOGICAL WL0
PROGRAMMED LOGICAL WL0 +
DUMMY READ OPERATION
READ LOGICAL WL0
PROGRAMMED ALL WLs
READ LOGICAL WL0

PAGE 1

PAGE 2

PAGE 3

TIME

ICC [a.u.]

*FIG. 18*

DMYREAD

| ADD = XXX [7] | [6] | [5] | [4] | [3] | [2] | [1] | [0] | 1T | VALUE |
|---|---|---|---|---|---|---|---|---|---|
|  |  |  |  |  | 0 | 0 | 0 |  | DISABLE |
|  |  |  |  |  | 0 | 0 | 1 |  | WL0-10 |
|  |  |  |  |  | 0 | 1 | 0 |  | WL0-30 |
|  |  |  |  |  | 0 | 1 | 1 |  | WL0-50 |
|  |  |  |  |  | 1 | 0 | 0 |  | WL0-60 |
|  |  |  |  |  | 1 | 0 | 1 |  | WL0-80 |
|  |  |  |  |  | 1 | 1 | 0 |  | WL0-120 |
|  |  |  |  |  | 1 | 1 | 1 |  | WL0-161 |

*FIG. 19*

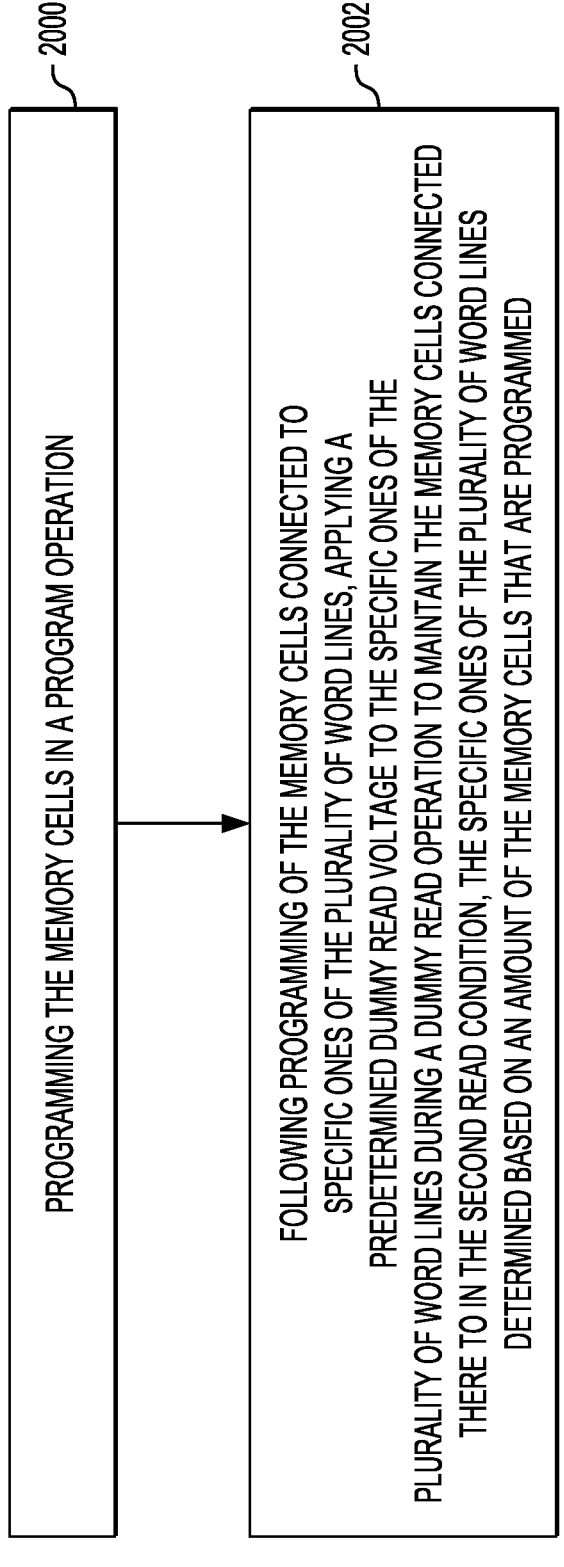

2000

PROGRAMMING THE MEMORY CELLS IN A PROGRAM OPERATION

2002

FOLLOWING PROGRAMMING OF THE MEMORY CELLS CONNECTED TO SPECIFIC ONES OF THE PLURALITY OF WORD LINES, APPLYING A PREDETERMINED DUMMY READ VOLTAGE TO THE SPECIFIC ONES OF THE PLURALITY OF WORD LINES DURING A DUMMY READ OPERATION TO MAINTAIN THE MEMORY CELLS CONNECTED THERE TO IN THE SECOND READ CONDITION, THE SPECIFIC ONES OF THE PLURALITY OF WORD LINES DETERMINED BASED ON AN AMOUNT OF THE MEMORY CELLS THAT ARE PROGRAMMED

*FIG. 20*

POWER SAVING DURING OPEN BLOCK READ WITH LARGE BLOCK OPENNESS

FIELD

This application relates to non-volatile memory apparatuses and the operation of non-volatile memory apparatuses.

BACKGROUND

This section provides background information related to the technology associated with the present disclosure and, as such, is not necessarily prior art.

Semiconductor memory devices have become more popular for use in various electronic devices. For example, non-volatile semiconductor memory is used in cellular telephones, digital cameras, personal digital assistants, mobile computing devices, non-mobile computing devices and other devices.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A memory device including such a 3D memory structure can include memory cells arranged in strings, where select gate transistors can be provided at the ends of the string to selectively connect a channel of the string to a source line or bit line. Such memory devices typically strive to be as energy efficient as possible, however, various challenges are presented, for example, accurately reading the memory cells while reducing current consumption.

SUMMARY

This section provides a general summary of the present disclosure and is not a comprehensive disclosure of its full scope or all of its features and advantages.

An object of the present disclosure is to provide a memory apparatus and a method of operating the memory apparatus that address and overcome the above-noted shortcomings.

Accordingly, it is an aspect of the present disclosure to provide an apparatus including memory cells each connected to one of a plurality of word lines and configured to retain a threshold voltage corresponding to one of a plurality of data states. The memory cells are operable in one of a first read condition in which a word line voltage of the plurality of word lines is discharged and a second read condition in which the word line voltage of the plurality of word lines is coupled up to a residual voltage level. A control means is coupled to the plurality of word lines and is configured to program the memory cells in a program operation. Following programming of the memory cells connected to specific ones of the plurality of word lines, the control means is also configured to apply a predetermined dummy read voltage to the specific ones of the plurality of word lines during a dummy read operation to maintain the memory cells connected thereto in the second read condition. The specific ones of the plurality of word lines are determined based on an amount of the memory cells that are programmed.

According to another aspect of the disclosure, a controller in communication with a memory apparatus including memory cells each connected to one of a plurality of word lines is provided. The memory cells are configured to retain a threshold voltage corresponding to one of a plurality of data states. The memory cells are also operable in one of a first read condition in which a word line voltage of the plurality of word lines is discharged and a second read condition in which the word line voltage of the plurality of word lines is coupled up to a residual voltage level. The controller is configured to instruct the memory apparatus to program the memory cells in a program operation. Following programming of the memory cells connected to specific ones of the plurality of word lines, the controller is configured to instruct the memory apparatus to apply a predetermined dummy read voltage to the specific ones of the plurality of word lines during a dummy read operation to maintain the memory cells connected thereto in the second read condition. The specific ones of the plurality of word lines are determined based on an amount of the memory cells that are programmed.

According to an additional aspect of the disclosure a method of operating a memory apparatus is provided. The memory apparatus includes memory cells each connected to one of a plurality of word lines. The memory cells are configured to retain a threshold voltage corresponding to one of a plurality of data states. The memory cells are also operable in one of a first read condition in which a word line voltage of the plurality of word lines is discharged and a second read condition in which the word line voltage of the plurality of word lines is coupled up to a residual voltage level. The method includes the step of programming the memory cells in a program operation. The method also includes the step of following programming of the memory cells connected to specific ones of the plurality of word lines, applying a predetermined dummy read voltage to the specific ones of the plurality of word lines during a dummy read operation to maintain the memory cells connected thereto in the second read condition. The specific ones of the plurality of word lines are determined based on an amount of the memory cells that are programmed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11C depicts a process for applying a dummy voltage to word lines in one or more blocks to couple up the word lines to the second read situation according to aspects of the disclosure;

FIG. 12 depicts control gate and channel voltages on a memory cell which acts as a capacitor when the control gate voltage is decreased in a sensing operation according to aspects of the disclosure;

FIG. 13 depicts a portion of the memory cell MC of FIG. 6 showing electron injection into a charge trapping region during weak programming according to aspects of the disclosure;

Figure 15:
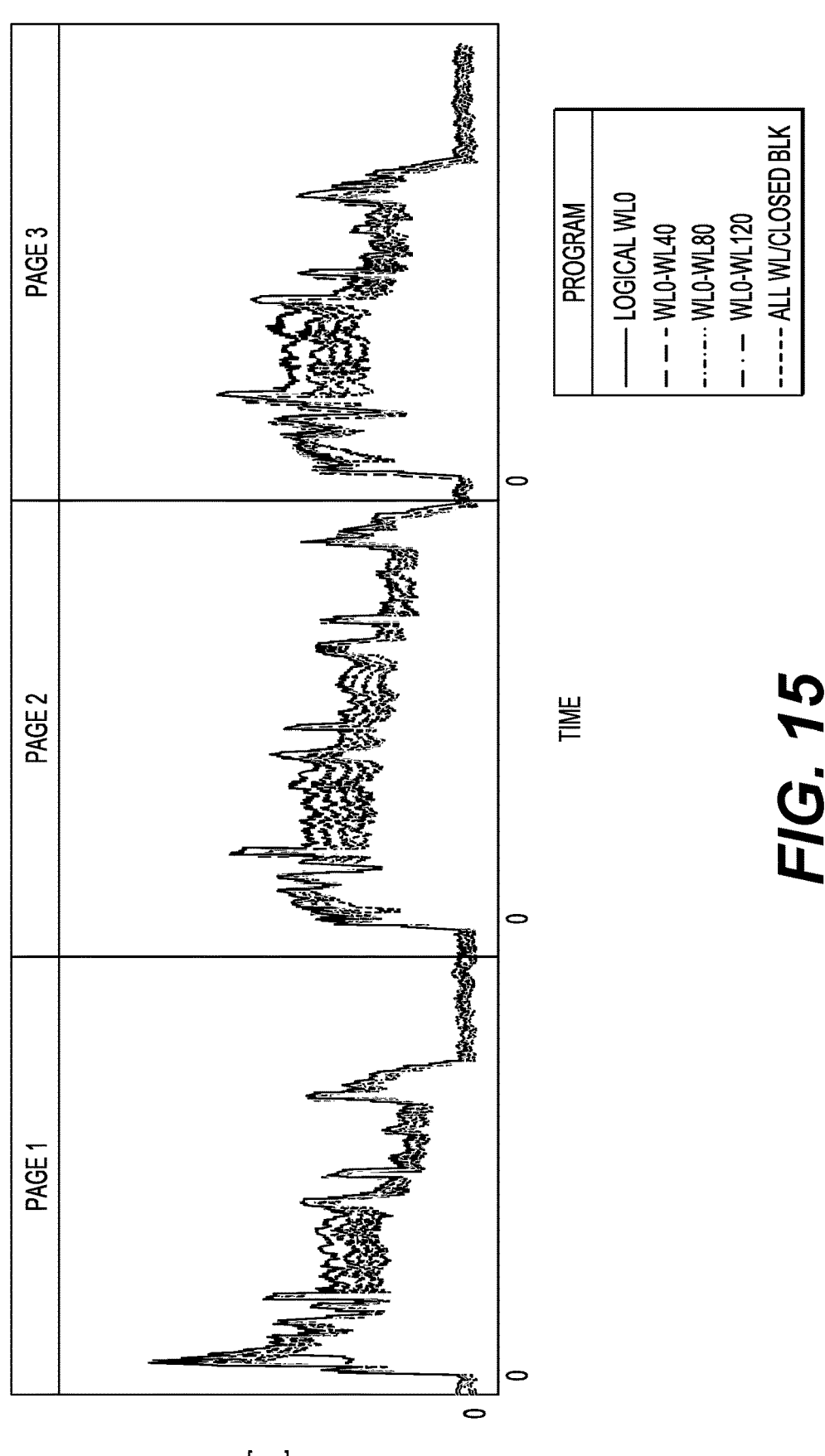
Figure 16:
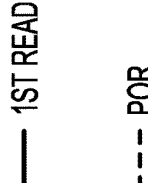
Figure 17:
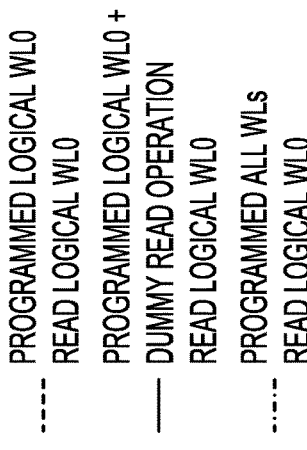

FIG. 15 is a plot of current consumption during a read operation of the first page (PAGE 1), the second page (PAGE 2), and the third page (PAGE 3) for an example memory apparatuses with memory cells of only one word line programmed, memory cells of word lines WL0-WL40 programmed, memory cells of word lines WL0-WL80 programmed, memory cells of word lines WL0-WL120 programmed, and memory cells of all of the word lines being programmed according to aspects of the disclosure;

FIG. 16 is a plot of current consumption during a read operation of the first page (PAGE 1), the second page (PAGE 2), and the third page (PAGE 3) for an example memory apparatus with memory cells of only one word line programmed using a first sequence for the read operation and using a second sequence for the read operation according to aspects of the disclosure;

FIG. 17 is a plot of current consumption during a read operation of the first page (PAGE 1), the second page (PAGE 2), and the third page (PAGE 3) for an example memory apparatus with memory cells of only one word line programmed, memory cells of only one word line programmed using a dummy read operation, and memory cells of all of the word lines being programmed according to aspects of the disclosure;

Figure 18:
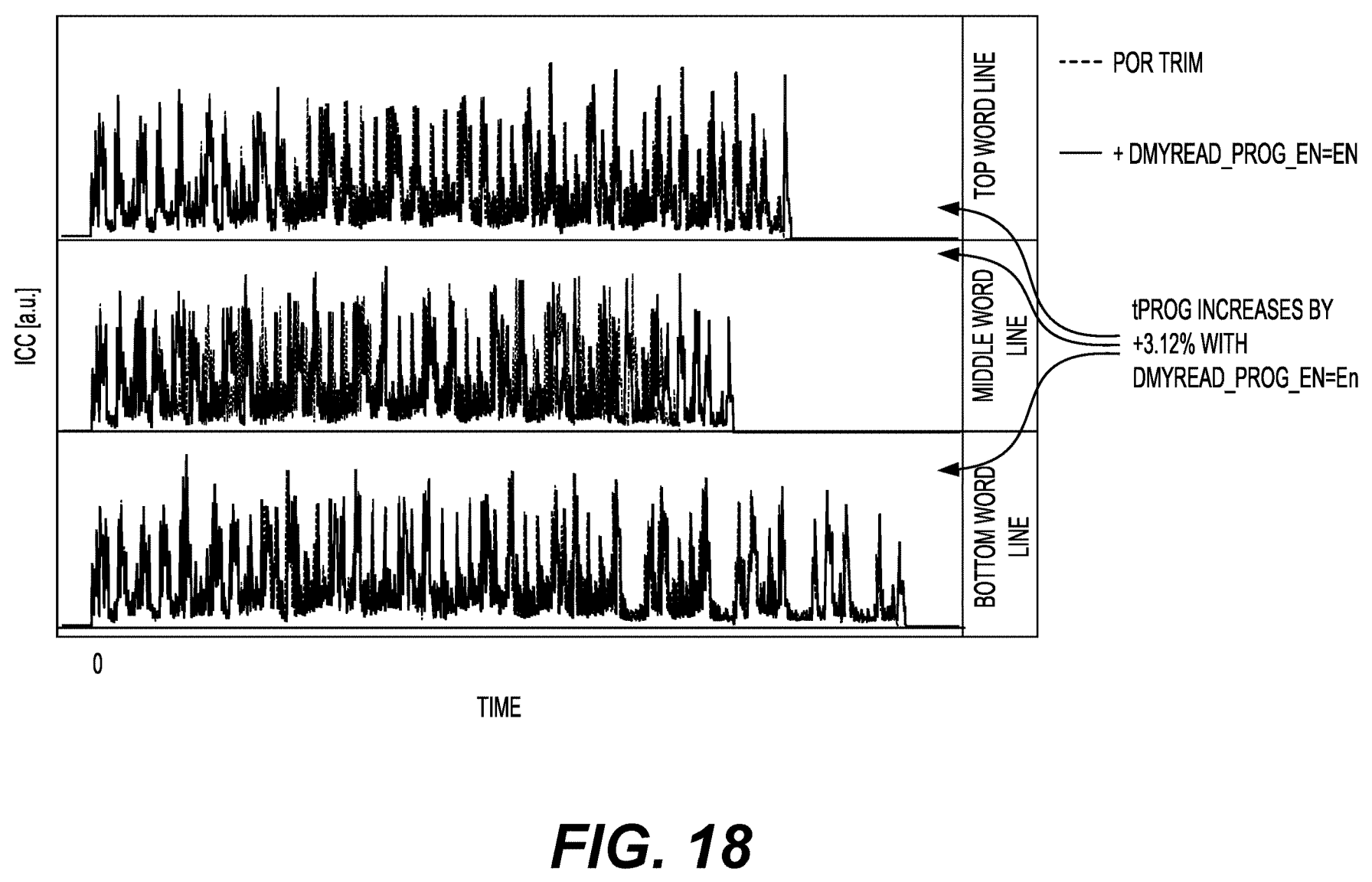

FIG. 18 is a plot of current consumption during a read operation of a bottom word line, a middle word line, and a top word line of a block for an example memory apparatus with memory cells of only one word line programmed without a dummy read operation and memory cells of only one word line programmed using a dummy read operation according to aspects of the disclosure;

FIG. 19 shows an example predetermined word line range parameter according to aspects of the disclosure; and FIG. 20 illustrates steps of a method of operating a memory apparatus according to aspects of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to non-volatile memory apparatuses of the type well-suited for use in many applications. The non-volatile memory apparatus and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In some memory devices, memory cells are joined to one another such as in NAND strings in a block or sub-block. Each NAND string comprises a number of memory cells connected in series between one or more drain-side SG transistors (SGD transistors), on a drain-side of the NAND string which is connected to a bit line, and one or more source-side SG transistors (SGS transistors), on a source-side of the NAND string which is connected to a source line. Further, the memory cells can be arranged with a common control gate line (e.g., word line) which acts a control gate. A set of word lines extends from the source side of a block to the drain side of a block. Memory cells can be connected in other types of strings and in other ways as well.

The memory cells can include data memory cells, which are eligible to store user data, and dummy or non-data memory cells which are ineligible to store user data. A dummy word line is connected to a dummy memory cell. One or more dummy memory cells may be provided at the drain and/or source ends of a string of memory cells to provide a gradual transition in channel gradient.

Figure 9:
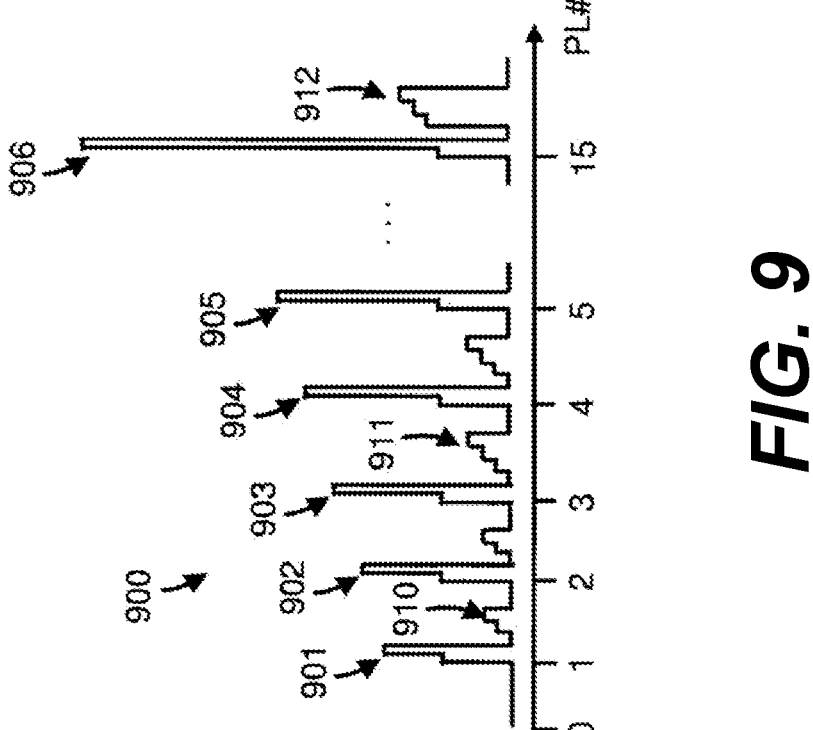
FIG. 9 depicts a waveform of an example programming operation according to aspects of the disclosure.

During a programming operation, the memory cells are programmed according to a word line programming order. For example, the programming may start at the word line at the source side of the block and proceed to the word line at the drain side of the block. In one approach, each word line is completely programmed before programming a next word line. For example, a first word line, WL0, is programmed using one or more programming passes until the programming is completed. Next, a second word line, WL1, is programmed using one or more programming passes until the programming is completed, and so forth. A programming pass may include a set of increasing program voltages which are applied to the word line in respective program loops or program-verify iterations, such as depicted in FIG. 9. Verify operations may be performed after each program voltage to determine whether the memory cells have completed programming. When programming is completed for a memory cell, it can be locked out from further programming while programming continues for other memory cells in subsequent program loops.

Each memory cell may be associated with a data state according to write data in a program command. Based on its data state, a memory cell will either remain in the erased state or be programmed to a programmed data state. For example, in a one bit per cell memory device, there are two data states including the erased state and the programmed state. In a two-bit per cell memory device, there are four data states including the erased state and three higher data states referred to as the A, B and C data states (see FIG. 8A). In a three-bit per cell memory device, there are eight data states including the erased state and seven higher data states referred to as the A, B, C, D, E, F and G data states (see FIG. 8C). In a four-bit per cell memory device, there are sixteen data states including the erased state and fifteen higher data states. The data states may be referred to as the S0, S1, S2, S3, S4, S5, S6, S7, S8, S9, S10, S11, S12, S13, S14 and S15 data states (see FIG. 8E) where S0 is the erased state.

After the memory cells are programmed, the data can be read back in a read operation. A read operation can involve applying a series of read voltages to a word line while sensing circuitry determines whether cells connected to the word line are in a conductive or non-conductive state. If a cell is in a non-conductive state, the Vth of the memory cell exceeds the read voltage. The read voltages are set at levels which are expected to be between the threshold voltage levels of adjacent data states.

However, it has been observed that the Vth of a memory cell can vary depending on when the read operation occurs. For example, the Vth can vary in the memory cells depending on a coupled up state of the word lines when the read operation occurs. A "first read" situation can be defined in which the word lines are not coupled up, and a "second read" situation can be defined in which the word lines are coupled up.

The memory cells can be in the first read situation after a power on event in the memory device. When the memory device is powered up for use, an operation may occur which checks for bad blocks. This operation involves applying 0 V or other low voltage to the word lines. As a result, any coupling up of the word line voltages is discharged.

The word lines can also be discharged in a block when the word line voltages are set to a low level. This can occur when the block is inactive while an operation is performed in another block. The cells can also be in the first read situation after a significant amount of time has passed after a last sensing operation, since the word lines discharge over time. The coupling up of the word lines causes a Vth shift in the cells due to inadvertent programming or erasing. Since the word lines are not significantly coupled up while in the first read situation, this Vth does not occur.

The cells can be in the second read situation or condition when the read occurs shortly, e.g., seconds or minutes, after a last sensing operation. Since the word lines are relatively strongly coupled up while in the second read situation, there is a programming or erasing of the cells due to the word line voltage, and a corresponding shift in the Vth. In particular, the word lines with a coupled-up voltage can cause weak programming of cells which have a relatively low Vth, lower than the coupled-up voltage, e.g., cells in lower programmed data states, thus resulting in a Vth upshift for these cells. Also, there can be a weak erasing of cells which have a relatively high Vth, higher than the coupled-up voltage, e.g., cells in higher programmed data states, thus resulting in a Vth downshift for these cells.

The cells gradually transition from the second read condition to the first read situation over time, e.g., one hour, as the word lines are discharged.

The coupling up of the word line voltage is caused by the voltages of a sensing operation such as a verify operation which occurs in connection with a programming operation, or a read operation which occurs after a programming operation is completed. The sensing of the cells involves the application of a sensing voltage (e.g., a read/verify voltage) to a selected word line. At the same time, a read pass voltage is applied to the unselected word lines and then stepped down. This step down temporarily reduces a channel voltage due to capacitive coupling. When the channel voltage increases back to its nominal level, this causes an increase or coupling up of the word line voltages, also due to capacitive coupling. For cells in the lower data states, the Vth gradually decreases as electrons which are trapped in the charge trapping material of the cells are de-trapped and return to the channel. For cells in the higher data states, the Vth gradually increases as electrons are removed from the channel. See FIGS. 10A-13.

The current consumption of the memory device during a read operation has been found to significantly increase for blocks that are open (i.e., memory cells connected to none or few of the word lines being programmed) compared to blocks that are closed (i.e., memory cells connected to all of the word lines being programmed). Such current consumption can be reduced by adding a dummy read operation after programming to transition the memory cells back to the second read condition. However, adding such a dummy read operation after programming every word line increases the programming time. Techniques provided herein address the above and other issues. Various features and benefits are described below.

Figures 1A, 1B:
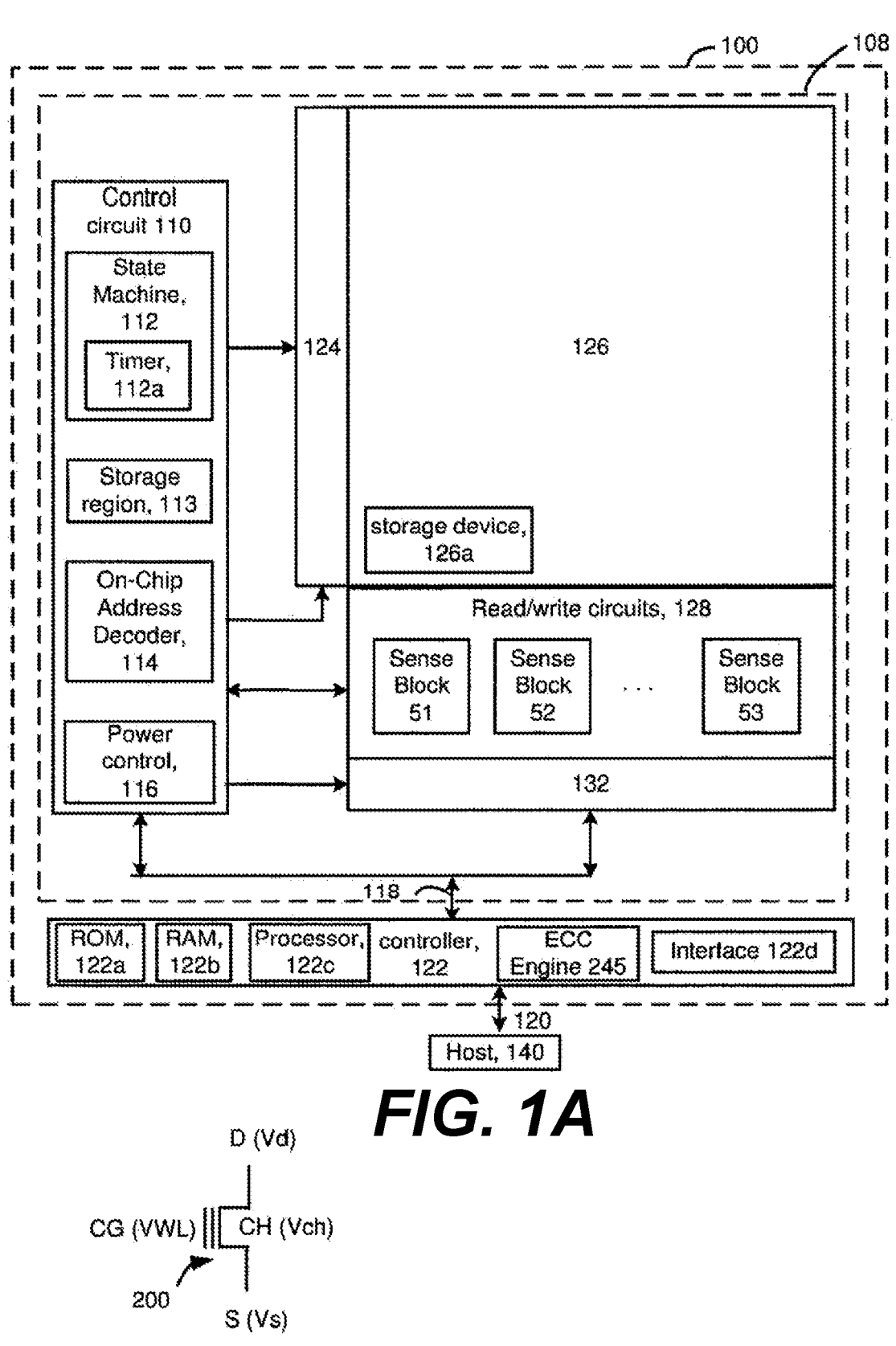
FIG. 1A is a block diagram of an example memory device according to aspects of the disclosure.
FIG. 1B depicts an example memory cell 200 according to aspects of the disclosure.

FIG. 1A is a block diagram of an example memory device. The memory device 100, such as a non-volatile storage system, may include one or more memory die 108. The memory die 108 includes a memory structure 126 of memory cells, such as an array of memory cells, a control circuit 110, and read/write circuits 128. The memory structure 126 is addressable by word lines via a row decoder 124 and by bit lines via a column decoder 132. The read/write circuits 128 include multiple sense blocks 51, 52, . . . , 53 (sensing circuitry) and allow a page of memory cells to be read or programmed in parallel. Typically a controller 122 is included in the same memory device 100 (e.g., a removable storage card) as the one or more memory die 108. The controller is separate from the memory die, e.g., off the die and is an example of an off-die circuit. Commands and data are transferred between the host 140 and controller 122 via a data bus 120, and between the controller and the one or more memory die 108 via lines 118. The host is also off the die and is another example of an off-die circuit.

The memory structure can be 2D or 3D. The memory structure may comprise one or more array of memory cells including a 3D array. The memory structure may comprise a monolithic 3D memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

The control circuit 110 cooperates with the read/write circuits 128 to perform memory operations on the memory structure 126, and includes a state machine 112, an on-chip address decoder 114, and a power control module 116. The state machine 112 provides chip-level control of memory operations. The state machine may include a timer 112 a to determine an elapsed time since a last sensing operation or a last conditioning operation, as discussed further below. A storage region 113 may store operational parameters and software/code. In one embodiment, the state machine is programmable by the software. In other embodiments, the state machine does not use software and is completely implemented in hardware (e.g., electrical circuits).

The on-chip address decoder 114 provides an address interface between that used by the host or a memory controller to the hardware address used by the decoders 124 and 132. The power control module 116 controls the power and voltages supplied to the word lines, select gate lines and bit lines during memory operations. It can include drivers for word lines, SGS and SGD transistors and source lines. The sense blocks can include bit line drivers, in one approach. An SGS transistor is a select gate transistor at a source end of a NAND string, and an SGD transistor is a select gate transistor at a drain end of a NAND string.

In some implementations, some of the components can be combined. In various designs, one or more of the components (alone or in combination), other than memory structure 126, can be thought of as at least one control circuit which is configured to perform the techniques described herein including the steps of the processes described herein. For example, a control circuit may include any one of, or a combination of, control circuit 110, state machine 112, decoders 114 and 132, power control module 116, sense blocks 51, 52, . . . , 53, read/write circuits 128, controller 122, and so forth.

The off-chip controller 122 (which in one embodiment is an electrical circuit) may comprise a processor 122 c, storage devices (memory) such as ROM 122 a and RAM 122 b and an error-correction code (ECC) engine 245. The ECC engine can correct a number of read errors.

A memory interface 122 d may also be provided. The memory interface, in communication with ROM, RAM and processor, is an electrical circuit that provides an electrical interface between controller and memory die. For example, the memory interface can change the format or timing of signals, provide a buffer, isolate from surges, latch I/O and so forth. The processor can issue commands to the control circuit 110 (or any other component of the memory die) via the memory interface 122 d.

The storage device comprises code such as a set of instructions, and the processor is operable to execute the set of instructions to provide the functionality described herein. Alternatively or additionally, the processor can access code from a storage device 126 a of the memory structure, such as a reserved area of memory cells in one or more word lines.

For example, code can be used by the controller to access the memory structure such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122 c fetches the boot code from the ROM 122 a or storage device 126 a for execution, and the boot code initializes the system components and loads the control code into the RAM 122 b. Once the control code is loaded into the RAM, it is executed by the processor. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below, and provide the voltage waveforms including those discussed further below. A control circuit can be configured to execute the instructions to perform the functions described herein.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a 2D memory structure or a 3D memory structure.

In a 2D memory structure, the semiconductor memory elements are arranged in a single plane or a single memory device level. Typically, in a 2D memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements. The columns may be arranged in a 2D configuration, e.g., in an x-y plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

2D arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

FIG. 1B depicts an example memory cell 200. The memory cell comprises a control gate CG which receives a word line voltage Vwl, a drain at a voltage Vd, a source at a voltage Vs and a channel at a voltage Vch.

Figure 2:
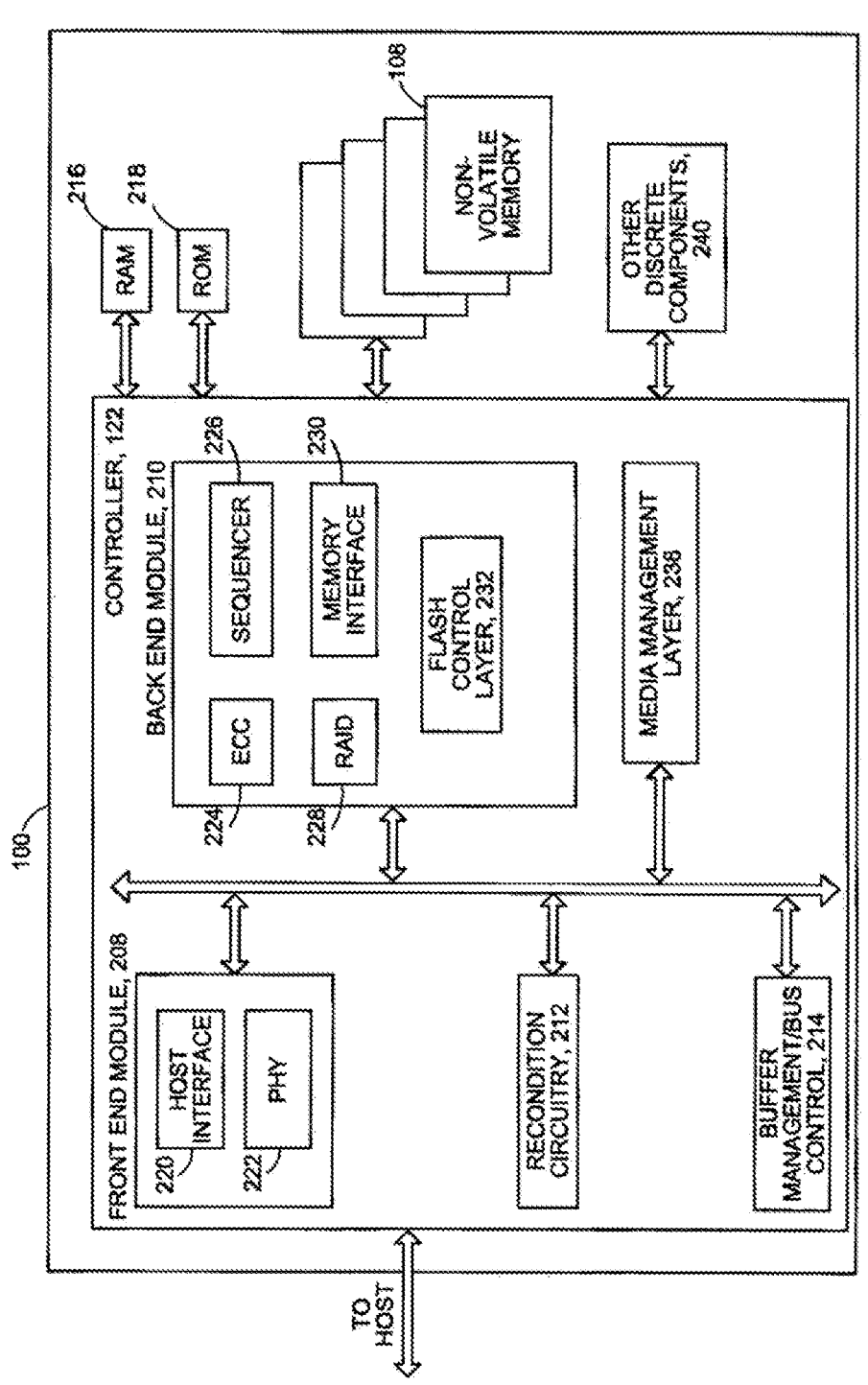
FIG. 2 is a block diagram of the example memory device 100, depicting additional details of the controller 122 according to aspects of the disclosure.

FIG. 2 is a block diagram of the example memory device 100, depicting additional details of the controller 122. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 122 and non-volatile memory die 108 may be any suitable flash interface. In one embodiment, memory device 100 may be a card based system, such as a secure digital (SD) or a micro secure digital (micro-SD) card. In an alternate embodiment, the memory system may be part of an embedded memory system. For example, the flash memory may be embedded within the host, such as in the form of a solid state disk (SSD) drive installed in a personal computer.

In some embodiments, the memory device 100 includes a single channel between the controller 122 and the non-volatile memory die 108, the subject matter described herein is not limited to having a single memory channel.

The controller 122 includes a front end module 208 that interfaces with a host, a back end module 210 that interfaces with the one or more non-volatile memory die 108, and various other modules that perform functions which will now be described in detail.

The components of the controller may take the form of a packaged functional hardware unit (e.g., an electrical circuit) designed for use with other components, a portion of a program code (e.g., software or firmware) executable by a processor, e.g., microprocessor, or processing circuitry that usually performs a particular function of related functions, or a self-contained hardware or software component that interfaces with a larger system, for example. For example, each module may include an Application Specific Integrated Circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for the controller to perform the functions described herein. The architecture depicted in FIG. 2 is one example implementation that may (or may not) use the components of the controller 122 depicted in FIG. 1A (e.g., RAM, ROM, processor, interface).

The controller 122 may include recondition circuitry 212, which is used for reconditioning memory cells or blocks of memory. The reconditioning may include refreshing data in its current location or reprogramming data into a new word line or block as part of performing erratic word line maintenance, as described below.

Referring again to modules of the controller 122, a buffer manager/bus controller 214 manages buffers in random access memory (RAM) 216 and controls the internal bus arbitration of Controller 122. The RAM may include DRAM and/or SRAM. DRAM or Dynamic Random Access Memory is a type of semiconductor memory in which the memory is stored in the form of a charge. Each memory cell in a DRAM is made of a transistor and a capacitor. The data is stored in the capacitor. Capacitors loose charge due to leakage and hence DRAMs are volatile devices. To keep the data in the memory, the device must be regularly refreshed. In contrast, SRAM or Static Random Access Memory will retain a value as long as power is supplied.

A read only memory (ROM) 218 stores system boot code. Although illustrated in FIG. 2 as being located separately from the controller, in other embodiments, one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back end module 210 includes an error correction controller (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the memory device 100. In some cases, the RAID module 228 may be a part of the ECC engine 224. Note that the RAID parity may be added as an extra die or dies as implied by the common name, but it may also be added within the existing die, e.g. as an extra plane, or extra block, or extra word lines within a block. A memory interface 230 provides the command sequences to non-volatile memory die 108 and receives status information from the non-volatile memory die. A flash control layer 232 controls the overall operation of back end module 210.

Additional components of memory device 100 include media management layer 238, which performs wear leveling of memory cells of non-volatile memory die 108. The memory system also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the memory structure 126, e.g., flash memory, of die 108. The MML 238 may be needed because: 1) the flash memory may have limited endurance; 2) the flash memory may only be written in multiples of pages; and/or 3) the flash memory may not be written unless it is erased as a block. The MML 238 understands these potential limitations of the flash memory which may not be visible to the host. Accordingly, the MML 238 attempts to translate the writes from host into writes into the flash memory. Erratic bits may be identified and recorded using the MML 238. This recording of erratic bits can be used for evaluating the health of blocks and/or word lines (the memory cells on the word lines).

The controller 122 may interface with one or more memory dies 108. In in one embodiment, the controller and multiple memory dies (together comprising the memory device 100) implement a solid state drive (SSD), which can emulate, replace or be used instead of a hard disk drive inside a host, as a network-attached storage (NAS) device, and so forth. Additionally, the SSD need not be made to work as a hard drive.

Figure 3:
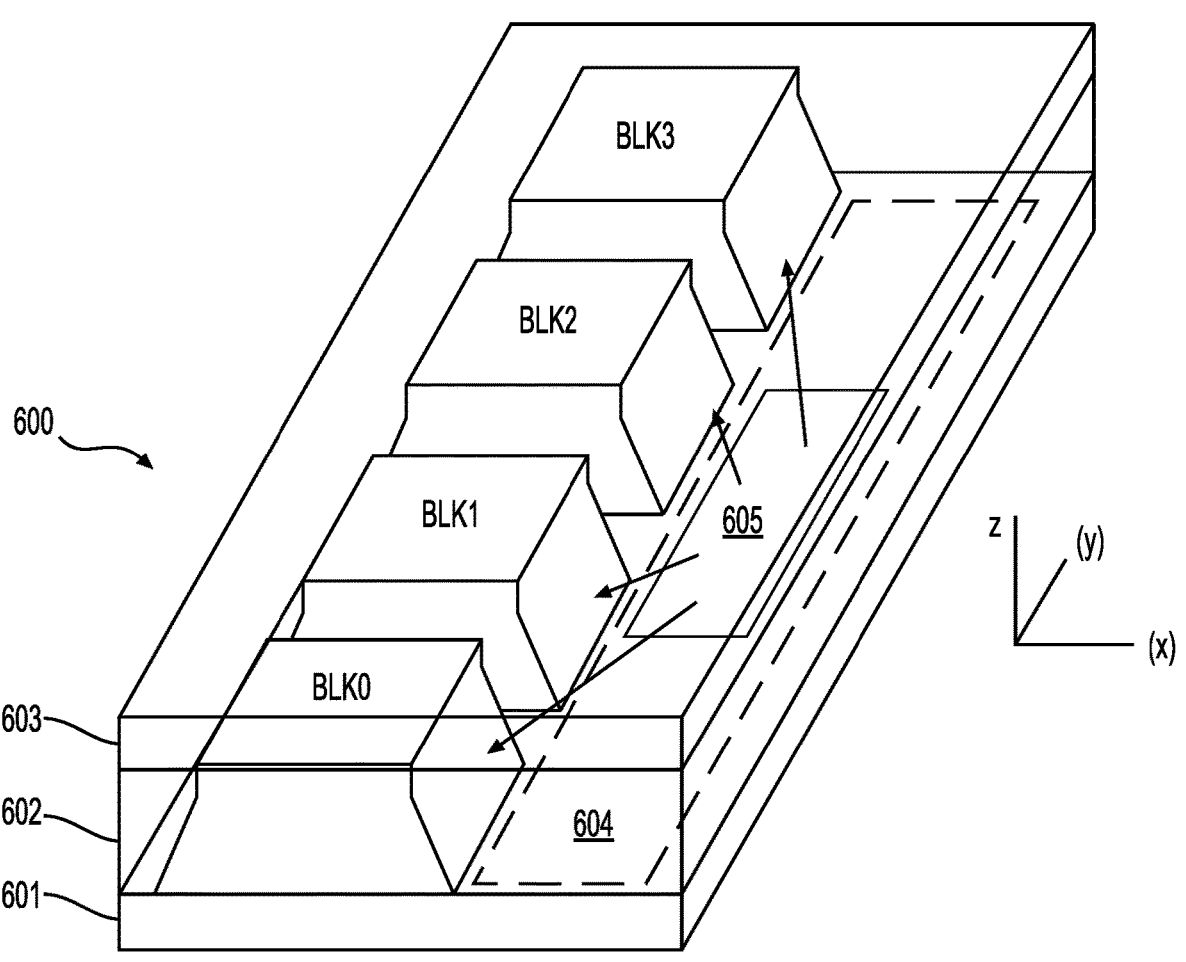
FIG. 3 is a perspective view of a memory device 600 comprising a set of blocks in an example 3D configuration of the memory structure 126 of FIG. 1 according to aspects of the disclosure.

FIG. 3 is a perspective view of a memory device 600 comprising a set of blocks in an example 3D configuration of the memory structure 126 of FIG. 1A. On the substrate are example blocks BLK0, BLK1, BLK2 and BLK3 of memory cells (storage elements) and a peripheral area 604 with circuitry for use by the blocks. For example, the circuitry can include voltage drivers 605 which can be connected to control gate layers of the blocks. In one approach, control gate layers at a common height in the blocks are commonly driven. The substrate 601 can also carry circuitry under the blocks, along with one or more lower metal layers which are patterned in conductive paths to carry signals of the circuitry. The blocks are formed in an intermediate region 602 of the memory device. In an upper region 603 of the memory device, one or more upper metal layers are patterned in conductive paths to carry signals of the circuitry. Each block comprises a stacked area of memory cells, where alternating levels of the stack represent word lines. In one possible approach, each block has opposing tiered sides from which vertical contacts extend upward to an upper metal layer to form connections to conductive paths. While four blocks are depicted as an example, two or more blocks can be used, extending in the x- and/or y-directions.

In one possible approach, the blocks are in a plane, and the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device. The blocks could also be arranged in multiple planes.

Figure 4:
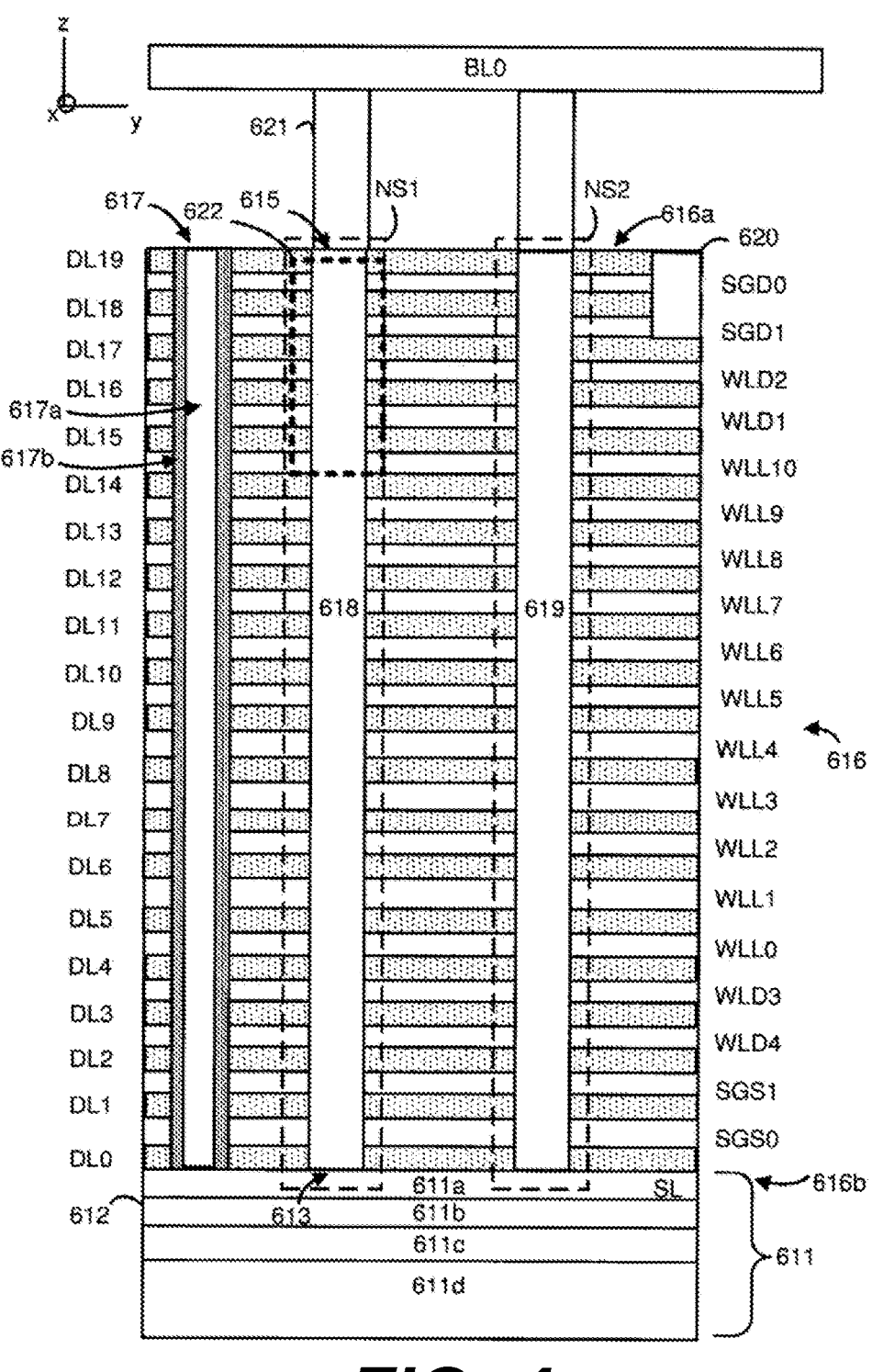
FIG. 4 depicts an example cross-sectional view of a portion of one of the blocks of FIG. 3 according to aspects of the disclosure.

FIG. 4 depicts an example cross-sectional view of a portion of one of the blocks of FIG. 3. The block comprises a stack 616 of alternating conductive and dielectric layers. In this example, the conductive layers comprise two SGD layers, two SGS layers and four dummy word line layers (or word lines) WLD1, WLD2, WLD3 and WLD4, in addition to data word line layers (or word lines) WLL0-WLL10. The dielectric layers are labelled as DL0-DL19. Further, regions of the stack which comprise NAND strings NS1 and NS2 are depicted. Each NAND string encompasses a memory hole 618 or 619 which is filled with materials which form memory cells adjacent to the word lines. A region 622 of the stack is shown in greater detail in FIG. 6.

The stack includes a substrate 611. In one approach, a portion of the source line SL comprises an n-type source diffusion layer 611 a in the substrate which is in contact with a source end of each string of memory cells in a block. The n-type source diffusion layer 611 a is formed in a p-type well region 611 b, which in turn is formed in an n-type well region 611 c, which in turn is formed in a p-type semiconductor substrate 611 d, in one possible implementation. The n-type source diffusion layer may be shared by all of the blocks in a plane, in one approach.

NS1 has a source-end 613 at a bottom 616 b of the stack and a drain-end 615 at a top 616 a of the stack. Local interconnects, such as local interconnect 617, may be provided periodically across the stack. The local interconnects may be metal-filled slits which extend through the stack, such as to connect the source line/substrate to a line above the stack. The slits may be used during the formation of the word lines and subsequently filled with metal. The local interconnect comprises a conductive region 617 a (e.g., metal) within an insulating region 617 b. A portion of a bit line BL0 is also depicted. A conductive via 621 connects the drain-end 615 of NS1 to BL0.

In one approach, the block of memory cells comprises a stack of alternating control gate and dielectric layers, and the memory cells are arranged in vertically extending memory holes in the stack.

In one approach, each block comprises a terraced edge in which vertical interconnects connect to each layer, including the SGS, WL and SGD layers, and extend upward to horizontal paths to voltage sources.

This example includes two SGD transistors, two drain side dummy memory cells, two source side dummy memory cells and two SGS transistors in each string, as an example. Generally, the use of dummy memory cells is optional and one or more may be provided. Also, one or more SGD transistors and one or more SGS transistors may be provided in a memory string.

An insulating region 620 may be provided to separate portions of the SGD layers from one another to provide one independently driven SGD line per sub-block. In this example, the word line layers are common to two adjacent sub-blocks. See also FIG. 7B. In another possible implementation, the insulating region 620 extends down to the substrate to separate the word line layers. In this case, the word line layers are separate in each sub-block. Although, in either case, the word line layers of a block can be joined at their ends to one another so that they are commonly driven within a block, as depicted in FIG. 7B.

Figure 5:
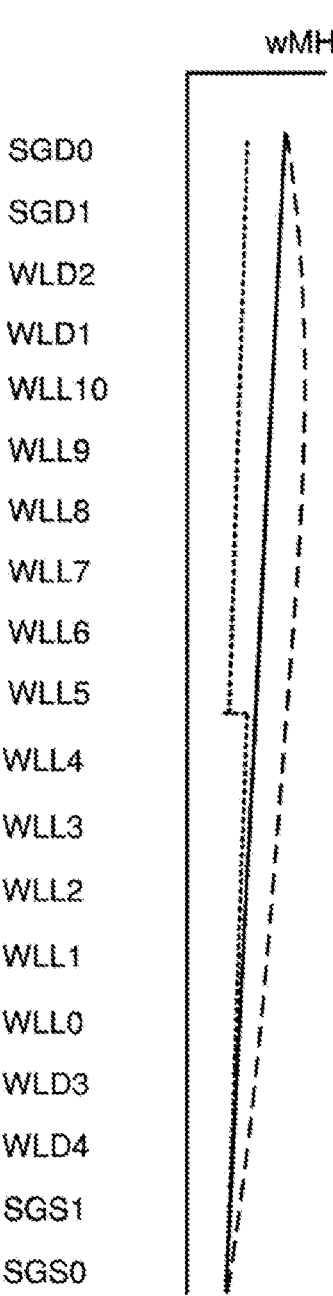
FIG. 5 depicts a plot of memory hole diameter in the stack of FIG. 4 according to aspects of the disclosure.

FIG. 5 depicts a plot of memory hole/pillar diameter in the stack of FIG. 4. The vertical axis is aligned with the stack of FIG. 4 and depicts a width (wMH), e.g., diameter, of the pillars formed by materials in the memory holes 618 and 619. In such a memory device, the memory holes which are etched through the stack have a very high aspect ratio. For example, a depth-to-diameter ratio of about 25-30 is common. The memory holes may have a circular cross-section. Due to the etching process, the memory hole and resulting pillar width can vary along the length of the hole. Typically, the diameter becomes progressively smaller from the top to the bottom of the memory hole (solid line). That is, the memory holes are tapered, narrowing at the bottom of the stack. In some cases, a slight narrowing occurs at the top of the hole near the select gate so that the diameter becomes slight wider before becoming progressively smaller from the top to the bottom of the memory hole (long dashed line). For example, the memory hole width is a maximum at the level of WL9 in the stack, in this example. The memory hole width is slightly smaller at the level of WL10, and progressively smaller at the levels of WL8 to WL0.

Due to the non-uniformity in the diameter of the memory hole and resulting pillar, the programming and erase speed of the memory cells can vary based on their position along the memory hole. With a relatively smaller diameter at the bottom of a memory hole, the electric field across the tunnel oxide is relatively stronger, so that the programming and erase speed is higher for memory cells in word lines adjacent to the relatively smaller diameter portion of the memory holes. The amount of word line coupling up and discharge is therefore relatively larger than for memory cells in word lines adjacent to the relatively larger diameter portion of the memory holes.

In another possible implementation, represented by the short dashed line, the stack is fabricated in two tiers. The bottom tier is formed first with a respective memory hole. The top tier is then formed with a respective memory hole which is aligned with the memory hole in the bottom tier. Each memory hole is tapered such that a double tapered memory hole is formed in which the width increases, then decreases and increases again, moving from the bottom of the stack to the top.

Figure 6:
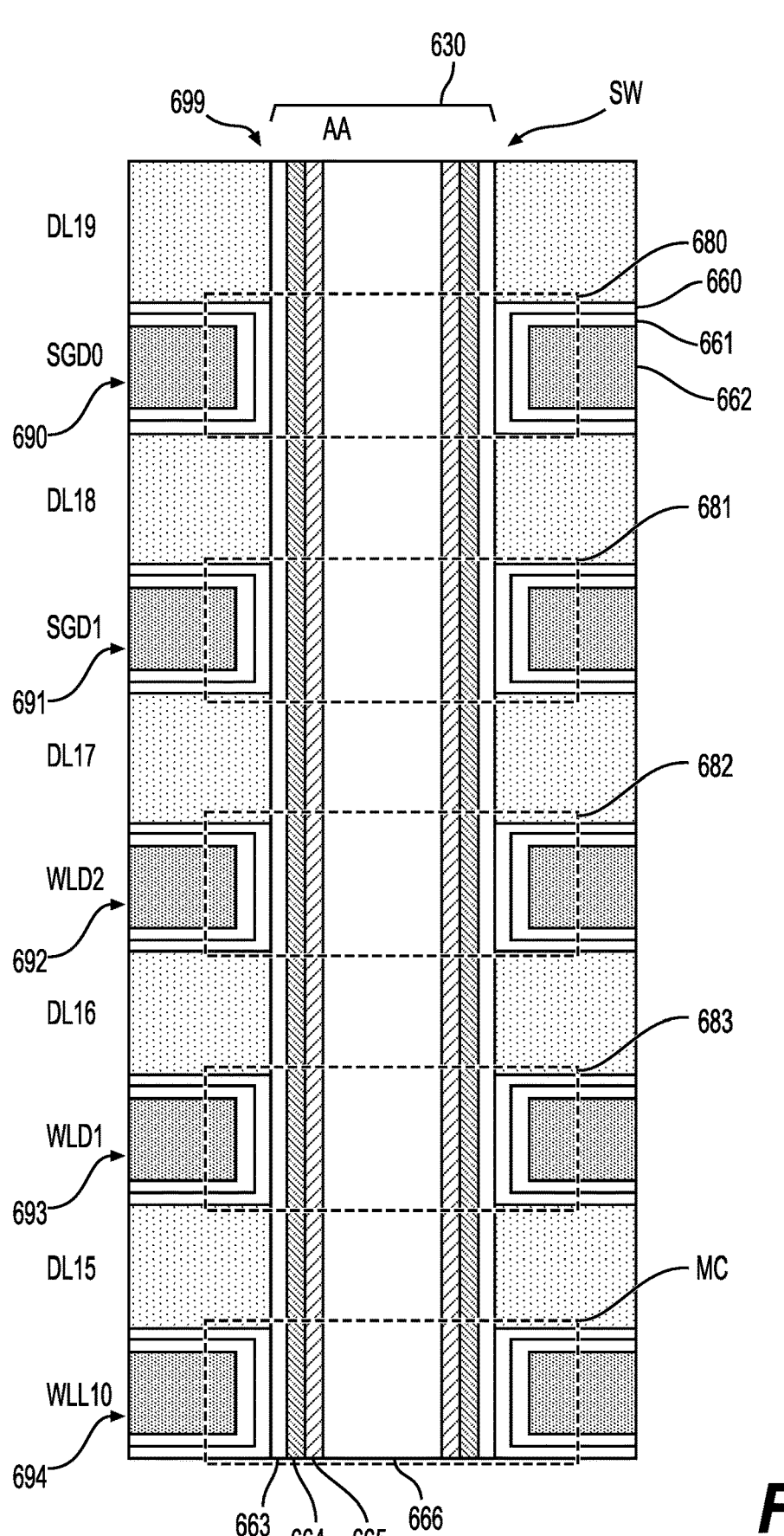
FIG. 6 depicts a close-up view of the region 622 of the stack of FIG. 4 according to aspects of the disclosure.

FIG. 6 depicts a close-up view of the region 622 of the stack of FIG. 4. Memory cells are formed at the different levels of the stack at the intersection of a word line layer and a memory hole. In this example, SGD transistors 680 and 681 are provided above dummy memory cells 682 and 683 and a data memory cell MC. A number of layers can be deposited along the sidewall (SW) of the memory hole 630 and/or within each word line layer, e.g., using atomic layer deposition. For example, each pillar 699 or column which is formed by the materials within a memory hole can include a charge-trapping layer 663 or film such as silicon nitride (Si$_3$N$_4$) or other nitride, a tunneling layer 664, a channel 665 (e.g., comprising polysilicon), and a dielectric core 666. A word line layer can include a blocking oxide/block high-k material 660, a metal barrier 661, and a conductive metal 662 such as Tungsten as a control gate. For example, control gates 690, 691, 692, 693 and 694 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a memory cell is programmed, electrons are stored in a portion of the charge-trapping layer which is associated with the memory cell. These electrons are drawn into the charge-trapping layer from the channel, and through the tunneling layer. The Vth of a memory cell is increased in proportion to (e.g., with an increase in) the amount of stored charge. During an erase operation, the electrons return to the channel.

Each of the memory holes can be filled with a plurality of annular layers comprising a blocking oxide layer, a charge trapping layer, a tunneling layer and a channel layer. A core region of each of the memory holes is filled with a body material, and the plurality of annular layers are between the core region and the word line in each of the memory holes.

The NAND string can be considered to have a floating body channel because the length of the channel is not formed on a substrate. Further, the NAND string is provided by a plurality of word line layers above one another in a stack, and separated from one another by dielectric layers.

Figure 7A:
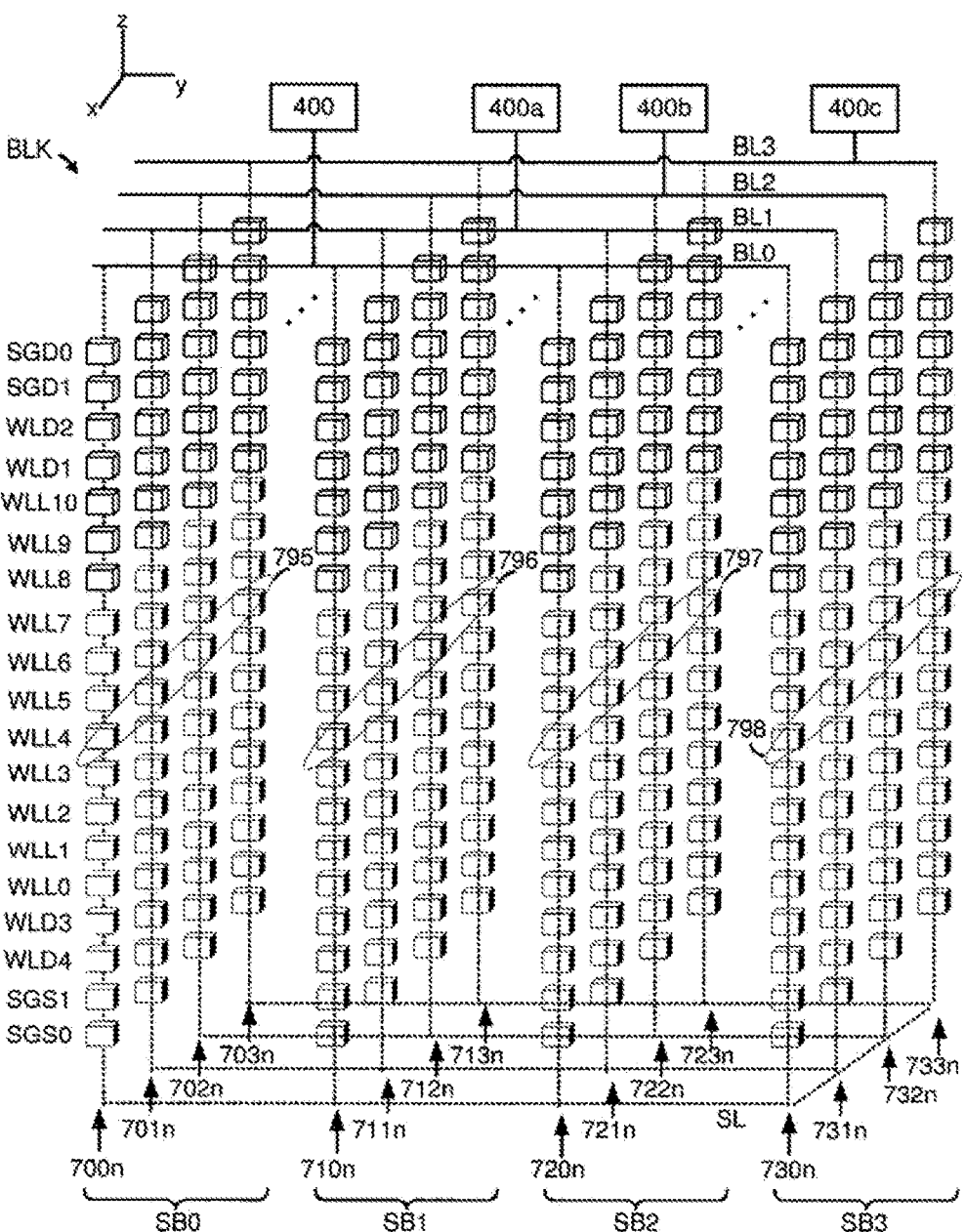
FIG. 7A depicts an example view of NAND strings in sub-blocks in a 3D configuration which is consistent with FIG. 4 according to aspects of the disclosure.
Figure 7B:
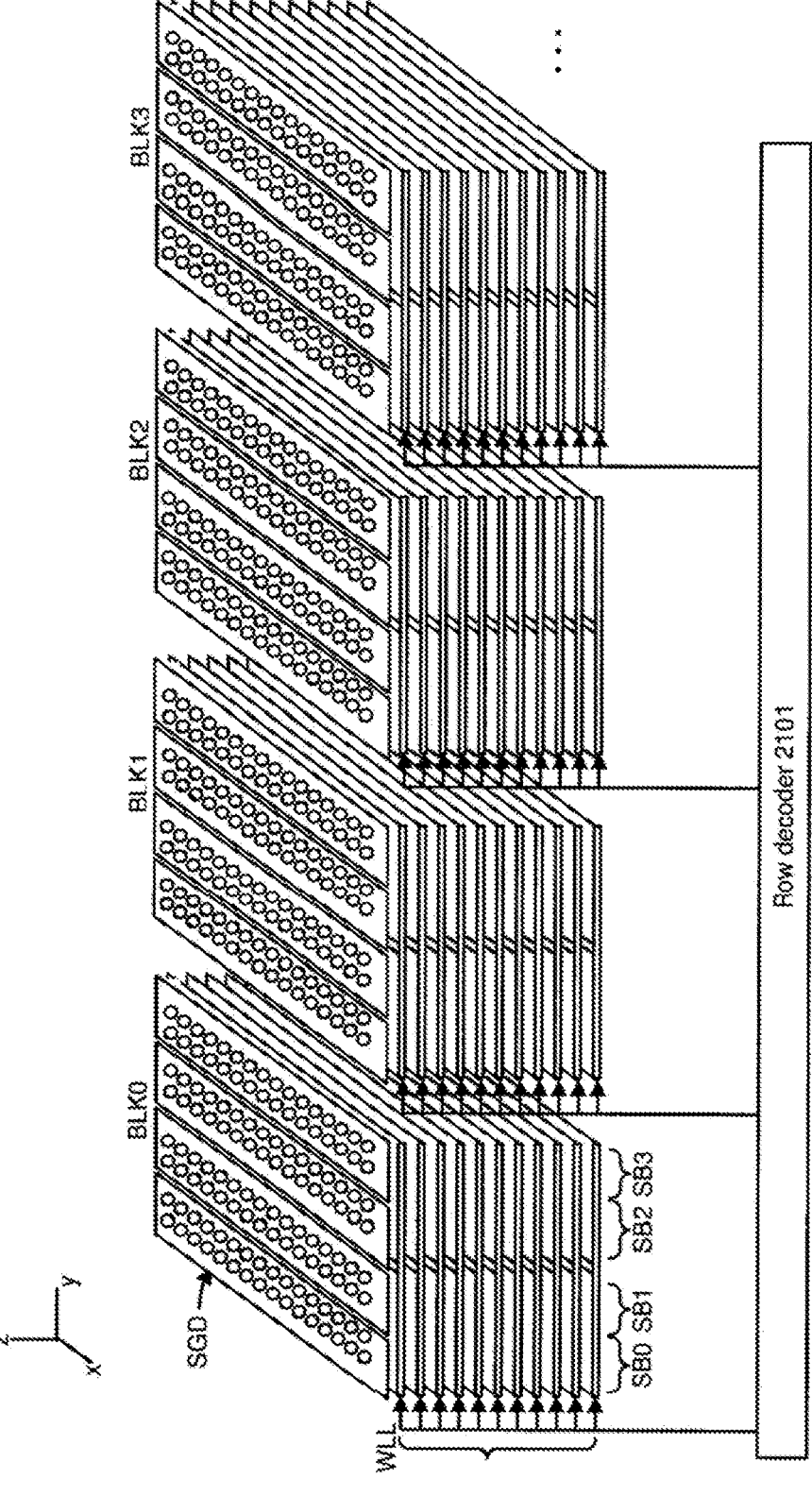
FIG. 7B depicts word line and SGD layers in an example set of blocks which is consistent with FIG. 4 according to aspects of the disclosure.

FIG. 7A depicts an example view of NAND strings in sub-blocks in a 3D configuration which is consistent with FIG. 4. Example memory cells are depicted which extend in the x direction along word lines in each sub-block. Each memory cell is depicted as a cube for simplicity. SB0 includes NAND strings 700 n, 701 n, 702 n and 703 n. SB1 includes NAND strings 710 n, 711 n, 712 n and 713 n. SB2 includes NAND strings 720 n, 721 n, 722 n and 723 n. SB3 includes NAND strings 730 n, 731 n, 732 n and 733 n. Bit lines are connected to sets of NAND strings. For example, a bit line BL0 is connected to NAND strings 700 n, 710 n, 720 n and 730 n, a bit line BL1 is connected to NAND strings 701 n, 711 n, 721 n and 731 n, a bit line BL2 is connected to NAND strings 702 n, 712 n, 722 n and 732 n, and a bit line BL3 is connected to NAND strings 703 n, 713 n, 723 n and 733 n. A sense circuit may be connected to each bit line. For example, sense circuits 400, 400 a, 400 b and 400 c are connected to bit lines BL0, BL1, BL2 and BL3, respectively. The NAND strings are examples of vertical memory strings, e.g., vertical strings, which extend upward from a substrate.

Programming and reading can occur for selected cells in one word line and one sub-block at a time. This allows each selected cell to be controlled by a respective bit line and/or source line. For example, an example set 795 of memory cells in SB0 is connected to WLL4. Similarly, the sets 796, 797 and 798 comprise data memory cells in SB1, SB2 and SB3 are connected to WLL4.

FIG. 7B depicts word line and SGD layers in an example set of blocks which is consistent with FIG. 4. Blocks BLK0, BLK1, BLK2 and BLK2 are depicted. The word line layers (WLL) in each block are depicted and long with example SGD lines. One SGD line is provided in each sub-block. BLK0 includes sub-blocks SB0, SB1, SB2 and SB3. Each circle represents a memory hole or string. The sub-blocks are elongated in the x direction and contain thousands of memory strings in practice. Additionally, many more blocks beyond those depicted are arranged in a row on the substrate. The word line layers and SGD/SGS layers may receive voltages from a row decoder 2101.

Figures 8A, 8B:
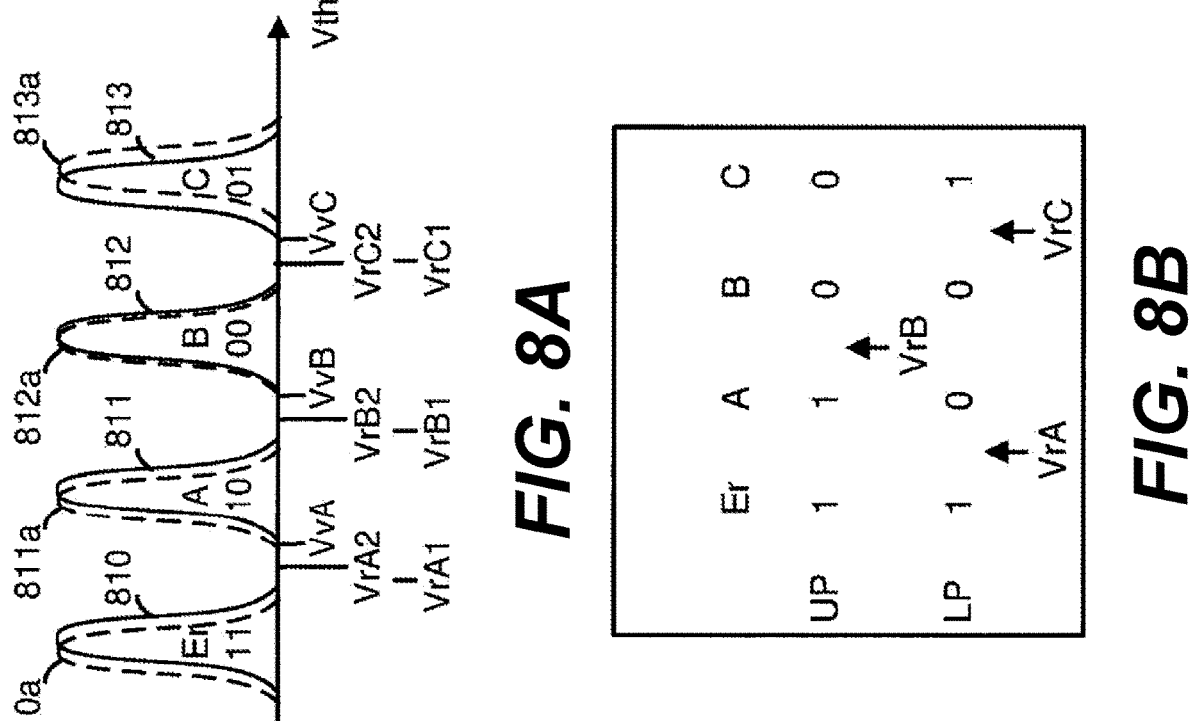
FIG. 8A depicts an example Vth distribution of memory cells, where four data states are used, in a first read situation compared to a second read situation according to aspects of the disclosure.
FIG. 8B depicts example bit sequences for lower and upper pages of data, and associated read voltages, for the Vth distributions of FIG. 8A according to aspects of the disclosure.

FIG. 8A depicts an example Vth distribution of memory cells, where four data states are used, in a first read situation compared to a second read situation. The data states are represented by Vth distributions 810, 811, 812 and 813 for the Er (erased), A, B and C states, respectively, in the second read situation, and by the Vth distributions 810 a, 811 a, 812

*a* and 813 *a*, respectively, in the first read situation. In some cases, as shown, the lower states have a lower Vth in the first read situation compared to the second read situation, while the higher states have a higher Vth in the first read situation compared to the second read situation. The mid-range states, which are between the lower states and the higher states, may have a same, or nearly the same, Vth in the first and second read situations.

In other cases, the mid-range and higher states may have a same Vth in the first and second read situations. For example, since a read operation for a page typically applies a read voltage for a lower state followed by a read voltage for a higher state, the cells of the higher states can be affected by the read of the lower states, and can transition toward the second read situation, such that the Vth upshift depicted in FIG. 8A is reduced.

The optimum read voltages generally are midway between the Vth distributions of adjacent data states. Accordingly, as the Vth distribution shifts, the optimum read voltages shift. For the second read situation, the optimum read voltages for the A, B and C states are VrA2, VrB2 and VrC2, respectively. For the first read situation, the optimum read voltages for the A, B and C states are VrA1, VrB1 and VrC1, respectively, where VrA2>VrA1, VrB2>VrB1 and VrC2<VrC1. During a programming operation, the verify voltages are VvA, VvB and VvC.

Each read voltage demarcates a lower boundary of a data state of a plurality of data states. For example, VrA1 or VrA2 demarcate a lower boundary of the A state.

The optimum read voltages are therefore different for the first read situation compared to the second read situation. In one approach, the optimum read voltages of the second read condition are used and a conditioning operation is periodically performed to ensure the cells are in, or close to, the second read condition when they are read.

Referring still 8A, the Vth to FIG. 8A, the Vth distributions 810, 811, 812 and 813 would be seen if the distributions are taken right after programming, in the second read situation. If we wait for a while, e.g., one hour, the Vth distributions 810 *a*, 811 *a*, 812 *a* and 813 *a* would be obtained, in the first read situation. If we take another after distribution a read operation, the Vth distributions 810, 811, 812 and 813 would be seen again. The read voltages may be optimized for the second read situation so that a number of read errors would be increased if the cells are in the first read situation.

The first read situation can occur when there is a long delay since a last programming or read operation. An example sequence is: program a block, wait for one hour, then read the block. The first read situation can also occur when there is a power down/power up. An example sequence is: program a block, power down/power up, then read the block. The first read situation can also occur when there is a program or read of other blocks. An example sequence is: program one block, program another block, then read the one block.

FIG. 8B depicts example bit sequences for lower and upper pages of data, and associated read voltages, for the Vth distributions of FIG. 8A. An example encoding of bits for each state is 11, 10, 00 and 01, respectively, in the format of upper page (UP) bit/lower page (LP) bit. A LP read may use VrA and VrC and an UP read may use VrB. A lower or upper bit can represent data of a lower or upper page, respectively. Three programmed data states A, B and C are used in addition to the erased state, Er. With these bit sequences, the data of the lower page can be determined by reading the memory cells using read voltages of VrA and VrC. The lower page (LP) bit=1 if Vth<=VrA or Vth>VrC. LP=0 if VrA<Vth<=VrC. The upper page (UP) bit=1 if Vth<=VrB and LP=0 if Vth>VrB. In this case, the UP is an example of a page which can be determined by reading using one read voltage applied to a selected word line. The UP is an example of a page which can be determined by reading using two read voltages applied to a selected word line. The read voltages are depicted as VrA, VrB and VrC, where each of these can represent the first or second read values, whichever is optimal.

Figure 8C:
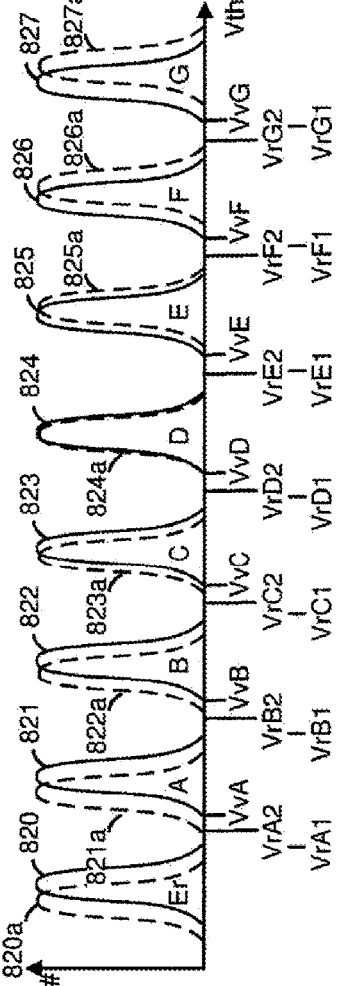
FIG. 8C depicts an example Vth distribution of memory cells, where eight data states are used, in a first read situation compared to a second read situation according to aspects of the disclosure.
Figure 8C:

FIG. 8C depicts an example Vth distribution of memory cells, where eight data states are used, in a first read situation compared to a second read situation. For the Er, A, B, C, D, E, F and G states, we have Vth distributions 820, 821, 822, 823, 824, 825, 826 and 827, respectively, in the second read situation, and 820 *a*, 821 *a*, 822 *a*, 823 *a*, 824 *a*, 825 *a*, 826 *a* and 827 *a*, respectively, in the first read situation. For the A, B, C, D, E, F and G states, we have verify voltages VvA, VvB, VvC, VvD, VvE, VvF and VvG, respectively, read voltages VrA2, VrB2, VrC2, VrD2, VrE2, VrF2 and VrG2, respectively, in the second read situation, read voltages VrA1, VrB1, VrC1, VrD1, VrE1, VrF1 and VrG1, respectively, in the first read situation, and example encoding of bits of 111, 110, 100, 000, 010, 011, 001 and 101, respectively. The bit format is: UP/MP/LP.

This example indicates the shift in the Vth distribution for the first read situation compared to the second read situation is relatively larger when the data state is relatively lower or higher, than when the data state is mid-range. The shift may be progressively larger for progressively lower or higher data states. In one example, the read voltages of VrA1, VrB1, VrC1 and VrD1 are optimal for the relatively lower states of A, B, C and D, respectively, and the read voltages of VrE1, VrF1 and VrG1 are optimal for the relatively higher states of E, F and G, respectively, in the first read situation. Similarly, the read voltages of VrA2, VrB2, VrC2 and VrD2 are optimal for the relatively lower states of A, B, C and D, respectively, and the read voltages of VrE2, VrF2 and VrG2 are optimal for the relatively higher states of E, F and G, respectively, in the second read situation. Furthermore, VrA1<VrA2, VrB1<VrB2, VrC1<VrC2, VrD1<VrD2, VrE1>VrE2, VrF1>VrF2 and VrG1>VrG2. Thus, the lower of two read voltages per state is optimal in the first read situation for the lower states and the higher of two read voltages per state is optimal in the first read situation for the higher states, in one possible implementation.

Figure 8D:
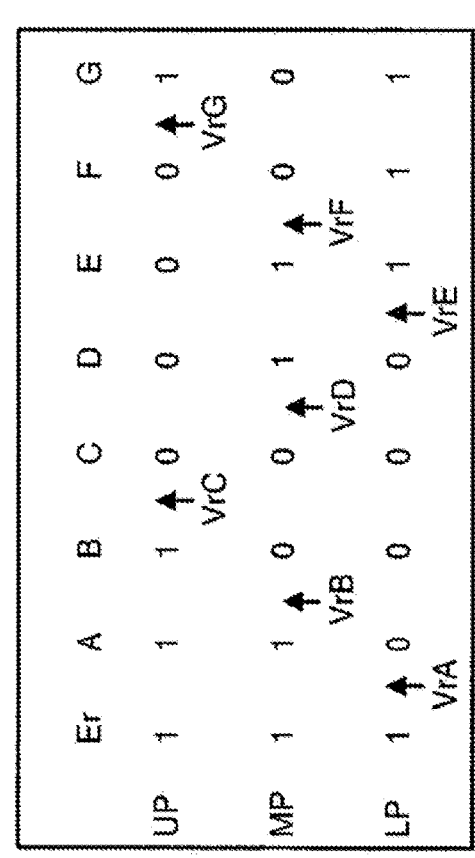
FIG. 8D depicts example bit sequences for lower, middle and upper pages of data, and associated read voltages, for the Vth distributions of FIG. 8C according to aspects of the disclosure.

FIG. 8D depicts example bit sequences for lower, middle and upper pages of data, and associated read voltages. In this case, the memory cells each store three bits of data in one of eight data states. Example bit assignments for each state are depicted. A lower, middle or upper bit can represent data of a lower, middle or upper page, respectively. Seven programmed data states A, B, C, D, E, F and G are used in addition to the erased state, Er. With these bit sequences, the data of the lower page can be determined by reading the memory cells using read voltages (e.g., control gate or word line voltages) of VrA and VrE. The lower page (LP) bit=1 if Vth<=VrA or Vth>VrE. LP=0 if VrA<Vth<=VrE. Generally, a memory cell can be sensed by sense circuitry while a read voltage is applied. If the memory cell is in a conductive state at a sense time, its threshold voltage (Vth) is less than the read voltage. If the memory cell is in a non-conductive state, its Vth is greater than the read voltage.

The read voltages which are used to read a page of data are determined by transitions from 0 to 1 or 1 to 0 in the encoded bits (code word) for each state. For example, the LP bit transitions from 1 to 0 between Er and A, and from 0 to 1 between D and E. Accordingly, the read voltages for the LP are VrA and VrE.

The data of the middle page can be determined by reading the memory cells using read voltages VrB, VrD and VrF. The middle page (MP) bit=1 if Vth<=VrB or VrD<Vth<=VrF. MP=0 if VrB<Vth<=VrD or Vth>VrF. For example, the MP bit transitions from 1 to 0 between A and B, from 0 to 1 between C and D, and from 1 to between E and F. Accordingly, the read voltages for the MP are VrB, VrD and VrF.

The data of the upper page can be determined by reading the memory cells using read voltages of VrC and VrG. The upper page (UP) bit=1 if Vth<=VrC or Vth>VrG. UP=0 if VrC<Vth<=VrG. For example, the UP bit transitions from 1 to 0 between B and C, and from 0 to 1 between F and G. Accordingly, the read voltages for the UP are VrC and VrG.

The read voltages are depicted as VrA, VrB, VrC, VrD, VrE, VrF and VrG, where each of these can represent the first or second read values, whichever is optimal.

Figure 8E:
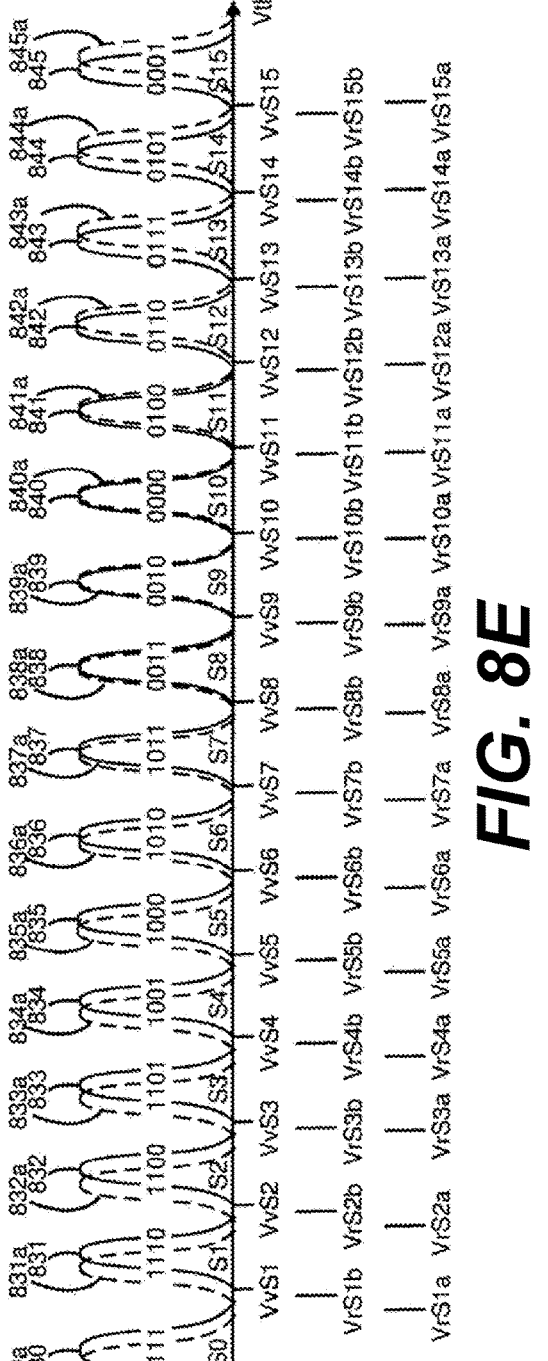
FIG. 8E depicts an example Vth distribution of memory cells, where sixteen data states are used, in a first read situation compared to a second read situation according to aspects of the disclosure.
Figure 8F:
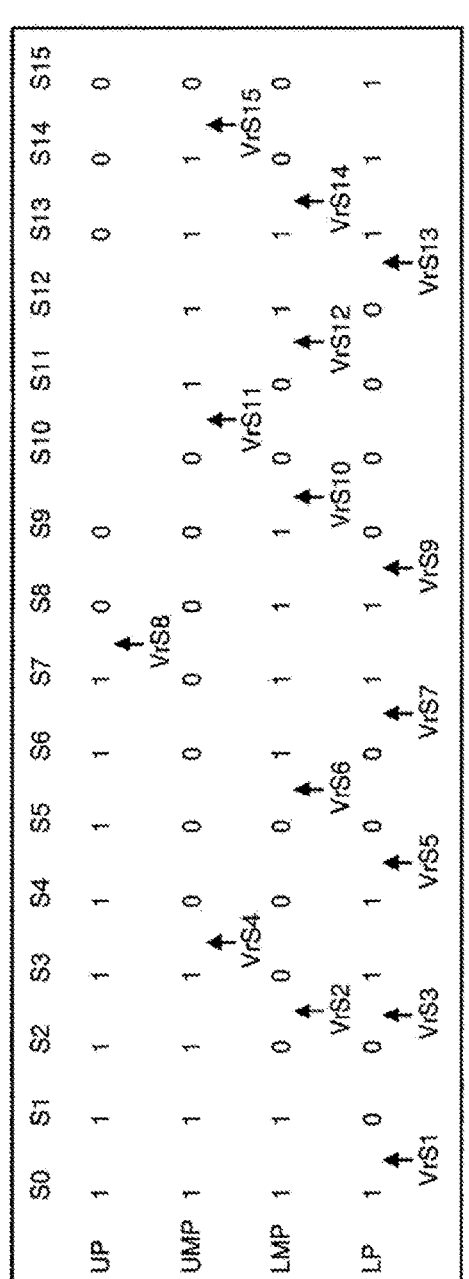
FIG. 8F depicts example bit sequences for lower, lower middle, upper middle and upper pages of data, and associated read voltages, for the Vth distributions of FIG. 8E according to aspects of the disclosure.

FIG. 8E depicts an example Vth distribution of memory cells, where sixteen data states are used, in a first read situation compared to a second read situation. Programming using four bits per cell (16 levels) can involve lower, lower-middle, upper-middle and upper pages. The data states are represented by Vth distributions 830, 831, 832, 833, 834, 835, 836, 837, 838, 839, 840, 841, 842, 843, 844 and 845 for the S0, S1, S2, S3, S4, S5, S6, S7, S8, S9, S10, S11, S12, S13, S14 and S15 states, respectively, in the first read situation, by Vth distributions 830 *a*, 831 *a*, 832 *a*, 833 *a*, 834 *a*, 835 *a*, 836 *a*, 837 *a*, 838 *a*, 839 *a*, 840 *a*, 841 *a*, 842 *a*, 843 *a*, 844 *a* and 845 *a*, respectively, in the second read situation, and an example encoding of bits for each state is 1111, 1110, 1100, 1101, 1001, 1000, 1010, 1011, 0011, 0010, 0000, 0100, 0110, 0111, 0101 and 0001, respectively, in the format of upper page (UP) bit/upper middle (UMP) page bit, lower middle (LMP) page bit, lower page (LP) bit, as depicted in FIG. 8E and FIG. 8F. The verify voltages are VvS1, VvS2, VvS3, VvS4, VvS5, VvS6, VvS7, VvS8, VvS9, VvS10, VvS11, VvS12, VvS13, VvS4 and VvS15. The optimum read voltages are VrS1 b, VrS2 b, VrS3 b, VrS4 b, VrS5 b, VrS6 b, VrS7 b, VrS8 b, VrS9 b, VrS10 b, VrS11 b, VrS12 b, VrS13 b, VrS14 b and VrS15 b in the second read situation and VrS1 a, VrS2 a, VrS3 a, VrS4 a, VrS5 a, VrS6 a, VrS7 a, VrS8 a, VrS9 a, VrS10 a, VrS11 a, VrS12 a, VrS13 a, VrS14 a and VrS15 a in the first read situation for states S1, S2, S3, S4, S5, S6, S7, S8, S9, S10, S11, S12, S13, S14 and S15, respectively.

FIG. 8F depicts example bit sequences for lower, lower middle, upper middle and upper pages of data, and associated read voltages, for the Vth distributions of FIG. 8E. A LP read may use VrS1, VrS3, VrS5, VrS7, VrS9 and VrS13. A LMP read may use VrS2, VrS6, VrS10, VrS12 and VrS14. An UMP read may use VrS4, VrS11 and VrS15. An UP read may use VrS8. The read voltages are depicted as VrS1, VrS2, VrS3, VrS4, VrS5, VrS6, VrS7, VrS8, VrS9, VrS10, VrS11, VrS12, VrS13, VrS4 and VrS15, where each of these can represent the first or second read values, whichever is optimal.

FIG. 9 depicts a waveform of an example programming operation. The horizontal axis depicts a program loop (PL) number and the vertical axis depicts control gate or word line voltage. Generally, a programming operation can involve applying a pulse train to a selected word line, where the pulse train includes multiple program loops or program-verify iterations. The program portion of the program-verify iteration comprises a program voltage, and the verify portion of the program-verify iteration comprises one or more verify voltages.

Each program voltage includes two steps, in one approach. Further, Incremental Step Pulse Programming (ISPP) is used in this example, in which the program voltage steps up in each successive program loop using a fixed or varying step size. This example uses ISPP in a single programming pass in which the programming is completed. ISPP can also be used in each programming pass of a multi-pass operation.

The waveform 900 includes a series of program voltages 901, 902, 903, 904, 905, . . . 906 that are applied to a word line selected for programming and to an associated set of non-volatile memory cells. One or more verify voltages can be provided after each program voltage as an example, based on the target data states which are being verified. 0 V may be applied to the selected word line between the program and verify voltages. For example, A- and B-state verify voltages of VvA and VvB, respectively, (waveform 910) may be applied after each of the program voltages 901 and 902. A-, B- and C-state verify voltages of VvA, VvB and VvC (waveform 911) may be applied after each of the program voltages 903 and 904. After several additional program loops, not shown, E-, F- and G-state verify voltages of VvE, VvF and VvG (waveform 912) may be applied after the final program voltage 906.

Figures 10A, 10B:
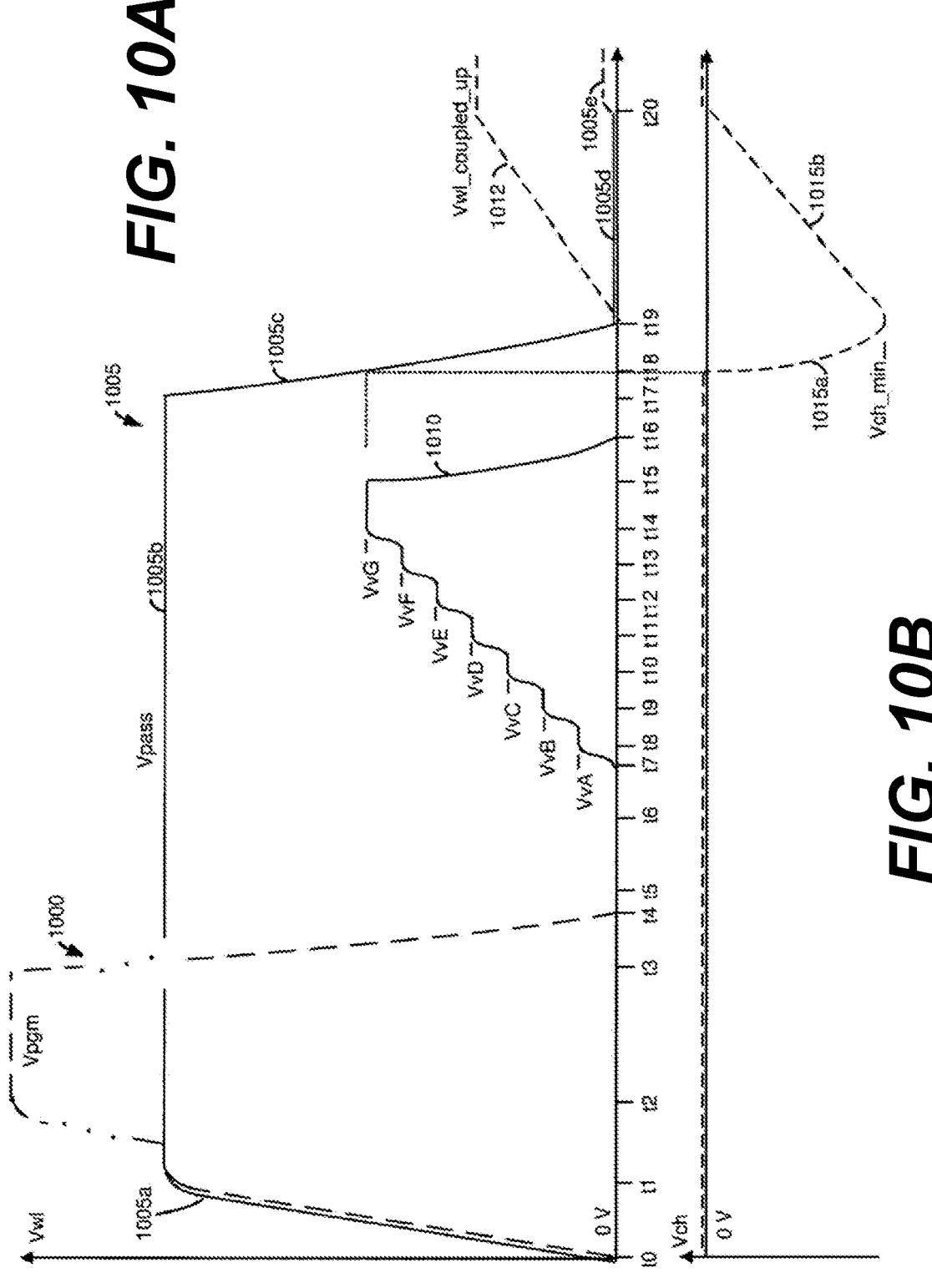
FIG. 10A depicts a plot of example waveforms in a programming operation according to aspects of the disclosure.
FIG. 10B depicts a plot of a channel voltage (Vch) corresponding to FIG. 10A according to aspects of the disclosure.

FIG. 10A depicts a plot of example waveforms in a programming operation. The time period shown represents one program-verify iteration. The horizontal axis depicts time and the vertical axis depicts word line voltage, Vwl. A program voltage 1000 is applied to a selected word line from t0-t4 and reaches a magnitude of Vpgm. The program voltage can temporarily pause at an intermediate level such as Vpass to avoid a single large transition which can have undesired coupling effects. A pass voltage 1005 is applied to the unselected word lines from t0-t19 and reaches a magnitude of Vpass, which is sufficiently high to provide the cells in a conductive state so that the sensing (e.g., verify) operations can occur for the cells of the selected word line. The pass voltage includes an increasing portion 1005 *a*, a fixed amplitude portion 1005 *b*, for instance, at Vpass and a decreasing portion 1005 *c*. Optionally, the pass voltage may be increased sooner relative to the program voltage so that Vpass is reached by to.

A verify voltage 1010 is applied to the selected word line. In this example, all seven verify voltages are applied, one after another. An eight-level memory device is used in this example. Verify voltages of VvA, VvB, VvC, VvD, VVE, VVF and VvG are applied at t8, t9, t10, t11, t12, t13 and t14, respectively. A single sense time may be used during each verify voltage. The waveform decreases from VvG to 0 V or other steady state level from t15-t16.

For the unselected word lines, the decrease in Vpass will cause the cells to transition from a conductive state to a non-conductive state. In particular, when the Vpass falls below the Vth of a cell, the channel of the cell will become cutoff, e.g., the cell will become non-conductive. The dotted line at t18 indicates when a cell with Vth=VvG becomes non-conductive. When a cell becomes non-conductive, it acts as a capacitor in which the control gate is one plate and the channel is another plate. As the pass voltage 1005 decreases from VvG to 0 V, the channel is capacitively coupled down by a similar amount, as represented by a dashed line 1015 *a* in FIG. 10B.

The plot 1012 is shown increasing relatively quickly but this is not to scale. In practice, the verify operation, e.g., from t5-t19, may consume about 100 microseconds, while the coupling up of the word line may be significantly longer, in the millisecond range such as 10 milliseconds.

FIG. 10B depicts a plot of a channel voltage (Vch) corresponding to FIG. 10A. The channel is capacitively coupled down to a minimum level of Vch_min from t18-t19 and then begins to return to its original, starting level of, e.g., 0 V from t19-t20. If the voltages of the word lines are allowed to float starting at t19, the voltages (plot 1012) are capacitively coupled higher by the increase in Vch (plot 1015 b). The voltages of the word lines float to a peak level of Vwl_coupled_up. For example, VvG may be 5 V, so that there is a 5 V change in the word line voltage, e.g., 5-0 V, which is coupled to the channel. Vch_min may be about-5 V in this example. There is a 5 V increase in Vch which is coupled to the word line, e.g., control gate, of the cells. Vwl_coupled_up may be about 4 V.

In contrast, if the voltages of the selected and unselected word lines are driven at a steady state level for a specified time after Vpass is ramped down, the coupling up of the word lines can be prevented or reduced. The plot 1005 d shows the word lines being driven at ground (0 V) or other steady state level which is relatively low, compared to Vpass, e.g., perhaps 0-10% of Vpass. In this example, the drivers of the unselected word lines are commanded to output Vpass at to. However, due to an RC time constant, some time is required to reach Vpass. Similarly, the drivers of the unselected word lines are commanded to output 0 V at t17, but some time is required to reach 0 V, e.g., at about t19. The unselected word lines are actually driven at 0 V from t19-t20 in this example although the driver tries to drive them at 0 V from t17-t20. At t20, the drivers of the unselected word lines are disconnected from the word lines so that the word line voltages can float slightly higher, as depicted by plot 1005 e. However, this coupling up is much smaller than that depicted by plot 1012. A small amount of coupling up of the word lines such as 1-2 V (compared to 5 V) will not significantly change the Vth of the associated memory cells and is therefore acceptable in this example.

By grounding the word lines for a specified amount of time after Vpass is stepped down, coupling up of the word lines can be reduced so that the Vth of the cells is not significantly shifted. The cells essentially remain in the first read situation. In this example, the read voltages of FIGS. 8A, 8C and 8E which correspond to the first read situation may be used in a subsequent read operation.

Figures 10C, 10D:
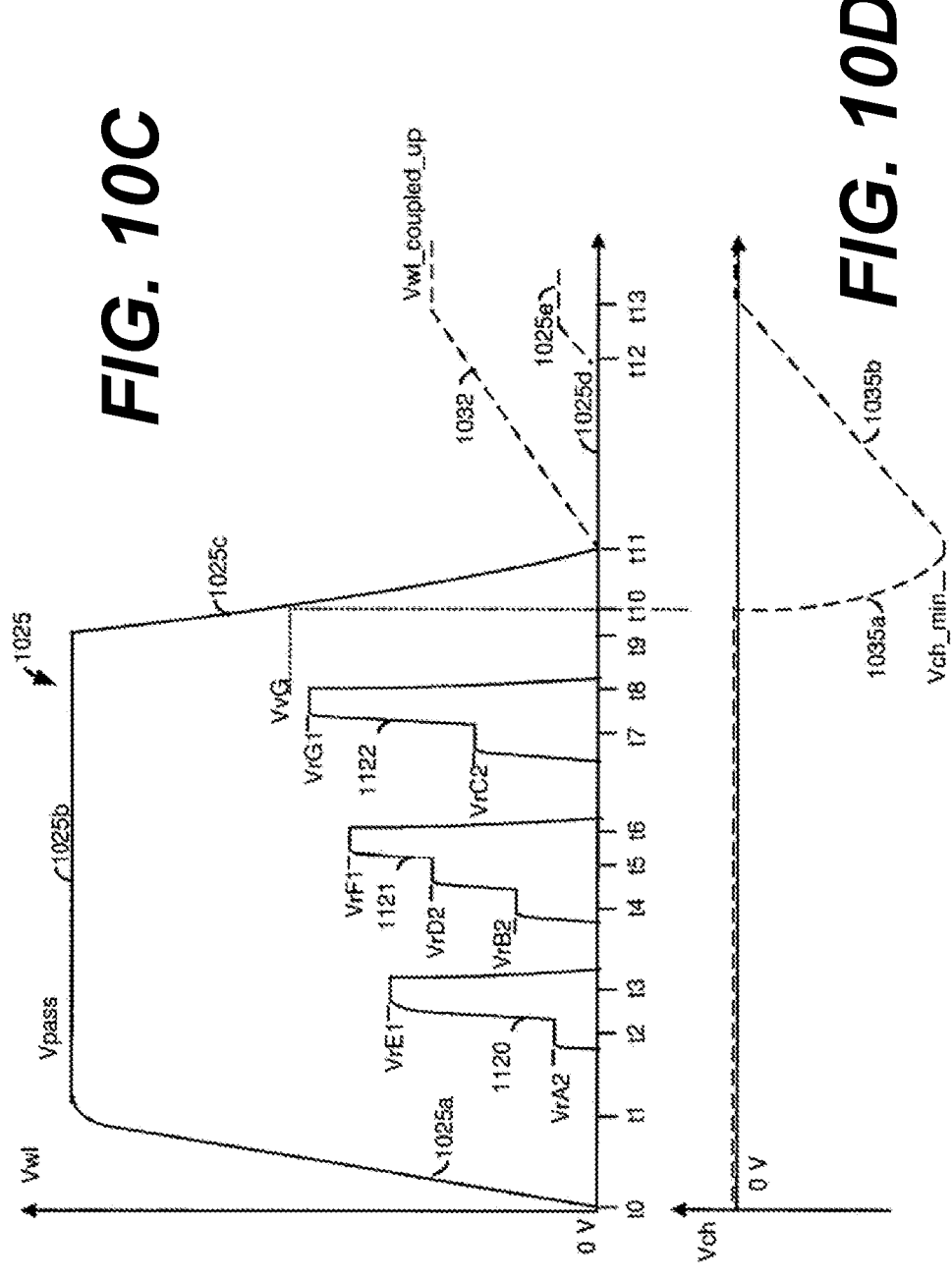
FIG. 10C depicts a plot of example waveforms in a read operation, where Vpass is applied continuously with read voltages of different pages according to aspects of the disclosure.
FIG. 10D depicts a plot of a channel voltage (Vch) corresponding to FIG. 10C according to aspects of the disclosure.

FIG. 10C depicts a plot of example waveforms in a read operation, where Vpass is applied continuously with read voltages of different pages. A read operation is similar to a verify operation as both are sensing operations and both can provide a coupling up of the word line voltages. The horizontal axis depicts time and the vertical axis depicts word line voltage, Vwl. A pass voltage 1025 is applied to the unselected word lines from t0-t9 and reaches a magnitude of Vpass. The pass voltage includes an increasing portion 1025 a, a portion 1025 b at Vpass and a decreasing portion 1025 c. A read voltage includes a separate waveform 1120 (at levels of VrA2 and VrE1), 1121 (at levels of VrB2, VrD2 and VrF1) and 1122 (at levels of VrC2 and VrG1) for each of the lower, middle and upper pages, respectively, consistent with FIGS. 8C and 8D. The read voltages are applied to the selected word line. An eight-level memory device is used in this example.

When VrA2, VrE1, VrB2, VrD2, VrF1, VrC2 and VrG1 are applied, the sense time may be t2, t3, t4, t5, t6, t7 and t8, respectively.

For the unselected word lines, the decrease in Vpass will cause the cells to transition from a conductive state to a non-conductive state, as discussed. The dotted line at t13 indicates when a cell with Vth=VVG becomes non-conductive. As the pass voltage 1025 decreases from VvG to 0 V, the channel is capacitively coupled down by a similar amount, as represented by the dashed line of plot 1035 a in FIG. 10D.

In another option, the voltages of the selected and unselected word lines are driven at a steady state level such as 0 V for a specified time after the ramp down of Vpass. The plot 1025 d shows the word lines being driven at ground (0 V) or other steady state level which is relatively low. The drivers of the unselected word lines are commanded to output 0 V at t9, but some time is required to reach 0 V, e.g., at about t11. The unselected word lines are actually driven at 0 V from t11-t12. The driver tries to drive the unselected word lines at 0 V from t9-t12. At t12, the drivers of the unselected word lines are disconnected from the word lines so that the word line voltages can float slightly higher, as depicted by plot 1025 e.

FIG. 10D depicts a plot of a channel voltage (Vch) corresponding to FIG. 10C. The channel is capacitively coupled down to a minimum level of Vch_min from t13-t14 and then begins to return to its original, starting level of, e.g., 0 V from t14-t15. If the voltages of the word lines are allowed to float starting at t14, the voltages (plot 1032) are capacitively coupled higher by the increase in Vch (plot 1035 b). The voltages of the word lines float to a peak level of Vwl_coupled_up, as discussed.

Figures 10E, 10F, 10G:
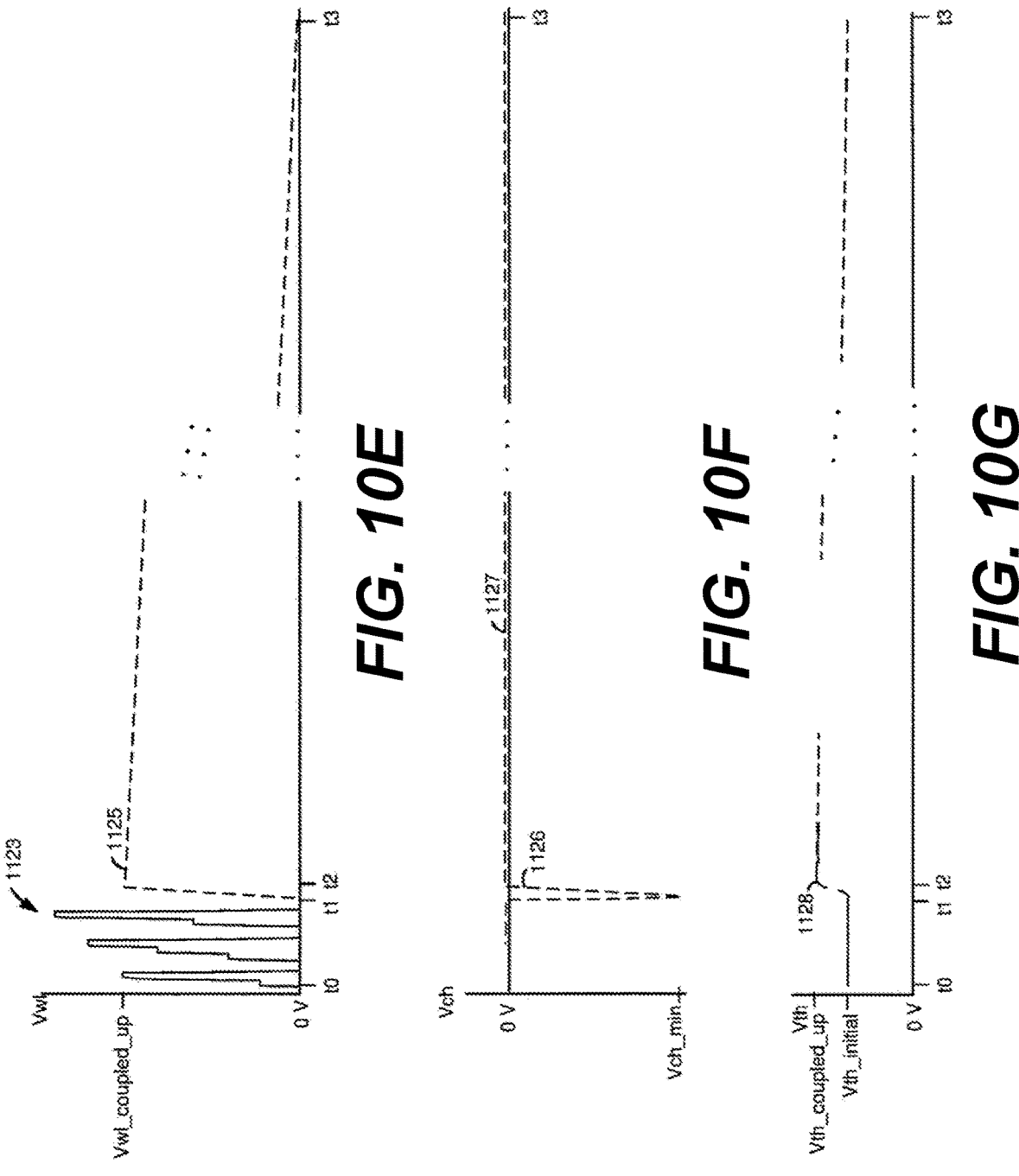
FIG. 10E depicts the waveforms of FIG. 10C showing a decay of the coupled up voltage of the word line according to aspects of the disclosure.
FIG. 10F depicts a plot of a channel voltage consistent with FIG. 10E according to aspects of the disclosure.
FIG. 10G depicts a plot of a Vth of a memory cell connected to the coupled up word line, consistent with FIGS. 10E and 10F according to aspects of the disclosure.

FIG. 10E depicts the waveforms of FIG. 10C showing a decay of the coupled up voltage of the word line. The time scale is different than in FIGS. 10A-10D and represents a longer time period such as one hour. The plot 1123 depicts the read voltages in a time period t0-t1. A plot 1125 depicts an increase in Vwl to a coupled up level (Vwl_coupled_up) due to coupling (in a time period t1-t2) followed by a decay of Vwl in a time period t2-t3. Generally, the increase in Vwl occurs relatively quickly compared to the time period of the decay. In case the word lines are grounded as discussed, they will not be coupled up as depicted by plot 1125.

FIG. 10F depicts a plot of a channel voltage consistent with FIG. 10E. A decrease to Vch_min followed by an increase (plot 1126) occurs in the time period t1-t2. Vch is about 0 V from t2-t3 (plot 1127).

FIG. 10G depicts a plot of a Vth of a memory cell connected to the coupled up word line, consistent with FIGS. 10E and 10F. For a cell in an example data state, such as the A state, the Vth is at an initial level, Vth_initial, from t0-t1. Vth increases from t1-t2 (plot 1128) due to coupling at the same time as the increase in Vch, to a peak level of Vth_coupled_up. The Vth then gradually decreases back to Vth_initial from t1-t3. This example applies when the word line voltage is allowed to be coupled up rather than being grounded, as discussed.

Figure 10H:
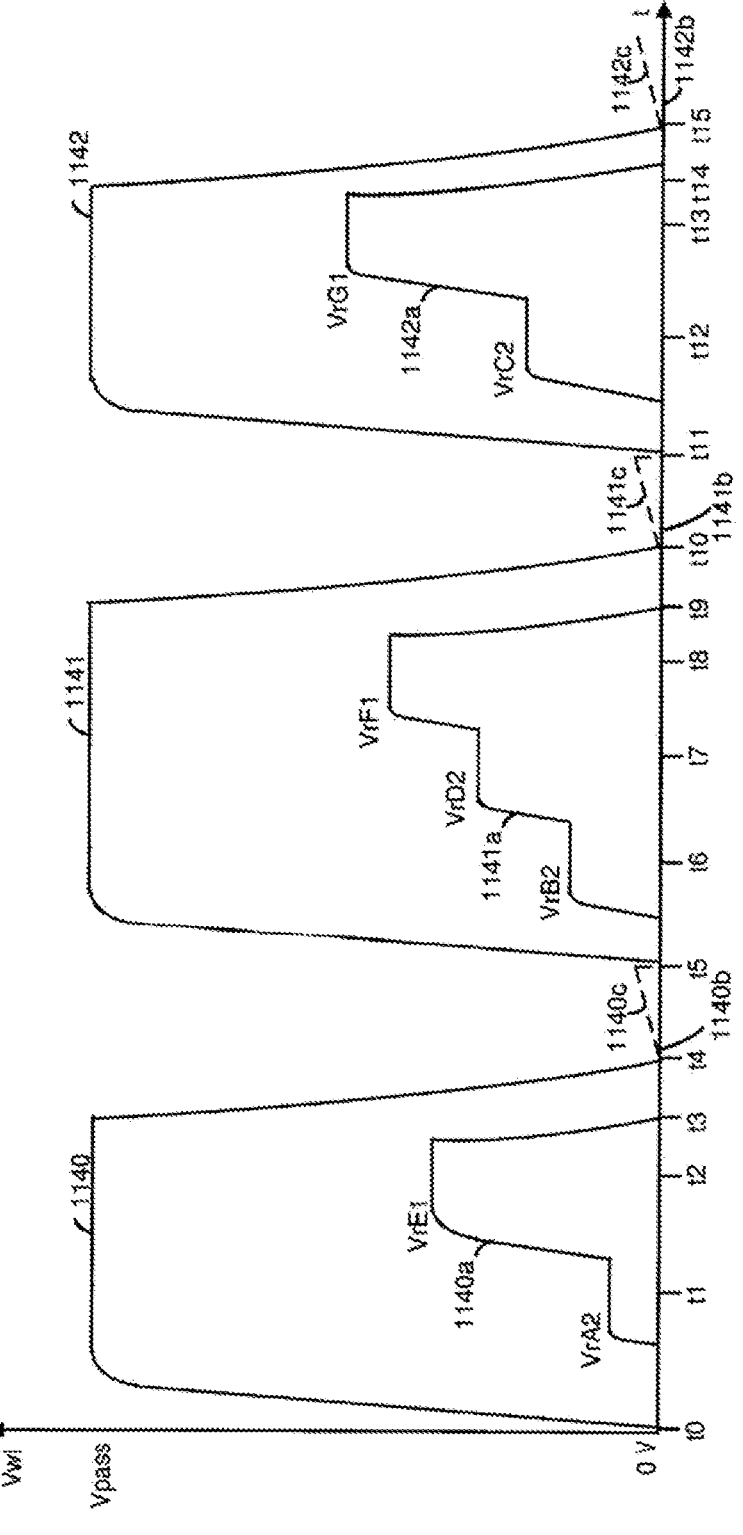
FIG. 10H depicts a plot of example waveforms in a read operation, where Vpass is applied separately during read voltages of different pages according to aspects of the disclosure.

FIG. 10H depicts a plot of example waveforms in a read operation, where Vpass is applied separately during read voltages of different pages. Vpass is ramped up and then back down separately during the read voltages of each of the lower, middle and upper pages, as depicted by plots 1140, 1141 and 1142, respectively, which extend from t0-t5, t5-t10 and t11-t15, respectively. This example is for an eight-state memory device. The example can be modified for fewer states (e.g., four states and two pages) or additional states (e.g., sixteen states and four pages). In one approach, the grounding of the word line voltages occurs after each ramp down of Vpass and one sense time per read voltage is used.

For example, the plots 1140 *b*, 1141 *b* and 1142 *b* may represent a grounding voltage being applied.

In another approach, the word line voltages are floated after each ramp down of Vpass. For example, the plots 1140 *c*, 1141 *c* and 1142 *c* may represent the word line voltages being floated and coupled up. The amount of the coupling may be limited by the time between the ramp up of Vpass for each page.

In a first portion of the read operation, the A and E states are read using a read voltage waveform of plot 1140 *a*. When VrA2 and VrE1 are applied, the sensing times may be t2 and t3, respectively. In a second portion of the read operation, the B, D and F states are read using a read voltage waveform 1141 *a*. When VrB2, VrD2 and VrF1 are applied, the sensing times may be t6, t7 and t8, respectively. In a third portion of the read operation, the C and G states are read using a read voltage waveform 1142 *a*. When VrC2 and VrG1 are applied, the sensing times may be t12 and t13, respectively.

Figures 11A, 11B:
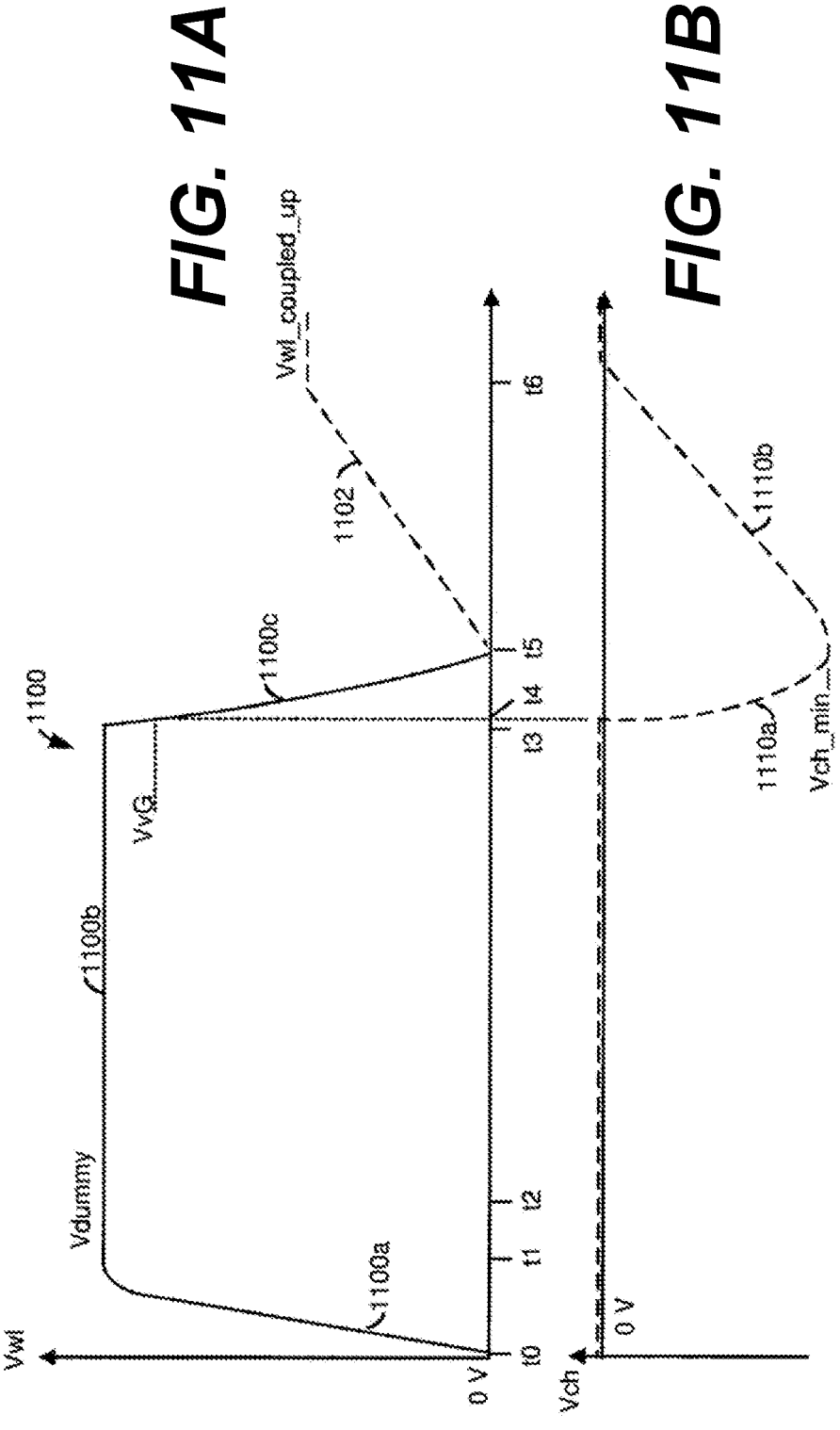
FIG. 11A depicts a plot of an example dummy voltage of a word line and a subsequent coupled up voltage of the word line according to aspects of the disclosure.
FIG. 11B depicts a plot of a channel voltage which is coupled down from a starting level and subsequently returns to the starting level, consistent with FIG. 11A according to aspects of the disclosure.

FIG. 11A depicts a plot of an example dummy voltage of a word line and a subsequent coupled up voltage of the word line. A dummy voltage or voltage pulse can be applied to one or more word lines in a block to avoid the first read situation and to cause the cells to transition to the second read situation. The dummy voltage triggers the coupling up of the word line voltage so that the second read situation is present when a read command is issued. One option is to apply the dummy read voltage in response to the issuance of a read command from the controller. To avoid a read time penalty, another option is to apply the dummy read voltage in response to a specified trigger such as the passage of a specified amount of time, e.g., 1-2 hours, since a last sensing operation. See FIG. 11C. This approach provides a periodic coupling up of Vwl so that a read operation can occur without delay in the normal read situation. Another specified trigger is the detection of a power on event. Other triggers are possible as well. For example, the dummy voltage can be applied when the memory device is in an idle state or when no other tasks with a higher priority are pending.

The magnitude of the dummy voltage, Vdummy, should be at least as high as a highest verify voltage of the different verify voltages used to program memory cells to different data states, in one implementation. For example, for a memory device with four, eight or sixteen states, Vdummy should be at least VvC, VVG or VvS15, respectively. This ensures that the maximum coupling down of Vch and the maximum coupling up of Vwl will occur.

One approach to applying a dummy voltage is to apply the voltage to all data word lines in a block concurrently. Another approach is to apply the voltage to fewer than all data word lines in a block concurrently. When the dummy voltage is applied, in one approach, the bit line voltage Vbl=0 V, and the voltages of the select gate control lines and the dummy word lines is sufficiently high to provide the select gate transistors and the dummy memory cells, respectively, in a conductive state, e.g., so the channel is not cutoff. By applying the dummy voltage at a sufficiently high level and then decreasing it back to 0 V, for instance, the normal read situation is provided before initiating a read operation.

The horizontal axis depicts time and the vertical axis depicts word line voltage, Vwl. A dummy voltage 1100 (e.g., a voltage pulse or waveform) is applied to the word lines in a block from t0-t5 and reaches a magnitude of Vdummy. The voltage includes an increasing portion 1100 *a*, a portion 1100 *b* at Vdummy and a decreasing portion 1100 *c*. Vdummy may be requested at t1 and 0 V may be requested at t3. The voltage drivers may be commanded to no longer provide a voltage at t5 (e.g., to disconnect the voltage drivers from the word lines) to allow the voltages to float.

A control circuit may be configured to command a voltage driver to increase voltages of the word lines from an initial level (e.g., 0 V) to an elevated level (e.g., Vdummy), and then to decrease the voltages of the word lines from the elevated level to a final level (e.g., 0 V). The control circuit, to float the voltages of the word lines, is configured to disconnect the voltage driver from the word lines a specified time (e.g., after a time duration of t5-t3) after requesting that the voltage driver decrease the voltages of the word lines from the elevated level to the final level.

At t4, the voltage falls below VvG so that the memory cells in the G state are made non-conductive state. The remaining transition of the voltage provides capacitive coupling, as discussed. Memory cells in lower states are made non-conductive when the voltage falls lower. Different contributions to the coupling up of a word line can therefore be made by the different cells connected to the word line according to their respective data states. An overall coupled up voltage on the word line will be provided.

As the dummy voltage 1100 decreases from VvG to 0 V, the channel is capacitively coupled down by a similar amount, as represented by a dashed line 1110 *a* in FIG. 11B.

FIG. 11B depicts a plot of a channel voltage which is coupled down from a starting level, e.g., 0 V, and subsequently returns to the starting level, consistent with FIG. 11A. The channel is capacitively coupled down to a minimum level of Vch_min and then begins to return to its starting level from t5-t6. The voltages of the word lines are allowed to float starting at t5, so that the voltages (plot 1102) are capacitively coupled higher by the increase in Vch (plot 1110 *b*). The voltages of the word lines float to a peak level of Vwl_coupled_up.

The dummy voltage can be implemented using firmware in the external controller combined with logic in the on-chip control circuitry. A new command can be defined in the on-chip control circuitry that applies a dummy read voltage to multiple blocks, without any host read request. This process does not involve any updates to the latches because no sensing occurs. The purpose of the dummy voltage is to place the memory array into the second read situation. With the new command, after each power up, (or periodically using a timer), all blocks are read using a multi block read command.

FIG. 11C depicts a process for applying a dummy voltage to word lines in one or more blocks to couple up the word lines to the second read situation. Various conditions can trigger the coupling up of the word lines. For example, step 1150 indicates that a power on event is detected. For instance, an event handler in a controller can determine whether a power on event has been detected. Step 1151 indicates that an elapsed time since a last read or programming operation, e.g., a last sensing operation, reaches a specified time. For example, this step can be responsive to a timer implemented by a controller. Step 1152 determines that a command has been issued for a read operation. If any of these steps occur, step 1153 is performed. This step involves concurrently applying a dummy voltage to each word line in one or more blocks to couple up the word lines to the second read situation. By concurrently applying the dummy voltage, the time allocated to the dummy voltage is minimized.

One approach is to apply a dummy voltage concurrently to all data word lines in each of one or more blocks. This can include data word lines but not dummy word lines, or both data word line and dummy word lines. Another approach is to apply the dummy voltage concurrently to fewer than all data word lines in a block in each of one or more blocks. Another approach is to apply dummy voltages one after another to different sets of word lines in a block. Another approach is to apply dummy voltages to one or more blocks at a time.

FIG. 12 depicts control gate and channel voltages on a memory cell which acts as a capacitor when the control gate voltage is decreased in a sensing operation. The first read issue is caused by the stacking of word line planes or layers in 3D, where the channels of the memory cells are floating and not coupled to the substrate as in 2D Flash NAND architectures. Word line coupling and electron trapping in oxide-nitride-oxide (ONO) layers are the sources of the first read issue.

As discussed, after a read/verify operation, when the read pass voltage (Vread) applied on a word line ramps down, the G-state cells, for example, with Vth ˜5 V, cut off the channel when Vread reduces to 5V. The floating channel potential then is pushed down to a negative value when Vread is further reduced to Vss. Next, the negative voltage in the channel shown above (about-5 V) increases after the read operation finishes by attracting positive charges. Since the data word lines are floating, the amount of holes needed to charge up the channel is relatively small, so the selected word line can be quickly coupled up to around 4 V. The unselected word lines can similarly be coupled up. The potential on the selected word line remains at ˜4 V for a while. This attracts and traps electron in the tunnel ONO layers and causes a Vth upshift, for instance, at least for the lower data states. The word line voltage thus rises to about 4 V after the read operation due to the coupling of the word line to the floating channel potential.

The top plate represents the control gate or word line and the bottom plate represents the channel. The capacitor 1040 represents a memory cell in the time period of t17-t18 in FIG. 10A or t9-t10 in FIG. 10C, where Vpass=8 V and VvG=5 V. The word line voltage transitions from 8 to 5 V and Vch=0 V. The capacitor 1042 represents a memory cell at t19 in FIG. 10B or t11 in FIG. 10C. Vwl=0 V and Vch=−5 V. The capacitor 1044 represents a memory cell just after t19 in FIG. 10A or just after t11 in FIG. 10C. Vwl floats and Vch=−5 V. The capacitor 1046 represents a memory cell after t20 in FIG. 10A or after t13 in FIG. 10C. Vwl=4 V and Vch=0 V. Here, the word line is in a maximum coupled up state. If the Vth of the memory cell is less than 4 V, the memory cell will be weakly programmed so that its Vth increases. If the Vth of the memory cell is more than 4 V, the memory cell will be weakly erased so that its Vth decreases. The capacitor 1048 represents a memory cell after a significant amount of time has passed, e.g., an hour or more. Vwl=0 V and Vch=0 V. See t3 in FIG. 10E.

When a data word line voltage floats, the amount of holes needed to charge up the channel is relatively small. As a result, the selected word line can be relatively quickly coupled up to about 4 V, for example. The potential on the selected word line remains at 4 V for a while, attracting electrons trapped in the tunnel oxide-nitride-oxide (ONO) layers and causing a Vth up-shift. If the wait before the next read operation is long enough, the coupled up potential of the word line will be discharged, and the trapped electrons will be de-trapped. The first read situation will occur again, resulting in an elevated number of read errors if a corrective action is not taken, such as periodically applying a dummy voltage which simulates the word line coupling up effects of a sensing operation, and/or adjusting the read voltages.

FIG. 13 depicts a portion of the memory cell MC of FIG. 6 showing electron injection into a charge trapping region during weak programming. The memory cell includes a control gate 694, a metal barrier 661 a, a blocking oxide 660 a, a charge-trapping layer 663, a tunneling layer 664, a channel 665 and a dielectric core 666. Due to the elevated word line voltage, an electric field (E) is created which attracts electrons (see example electron 1050) into the charge trapping layer, increasing the Vth. This weak programming may be caused by the Poole-Frenkel effect, in which an electrical insulator can conduct electricity. This is a kind of electron tunneling through traps. A weak erasing similarly involves an electric field which repels electrons from the charge trapping layer, decreasing the Vth.

Figure 14:
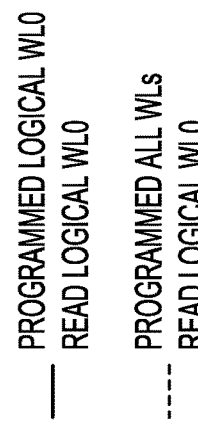
FIG. 14 is a plot of current consumption during a read operation of a first page (PAGE 1), a second page (PAGE 2), and a third page (PAGE 3) for an example memory apparatus with memory cells of only one word line programmed and memory cells of all of the word lines being programmed according to aspects of the disclosure.

As discussed, current consumption (ICC) during read operations has been found to be significantly higher for an open block (OB) (i.e., a block with few or none of the memory cells programmed) compared to a closed block (CB) (i.e., a block with all of the memory cells programmed). For a 99% open block (e.g., only one word line, word line WL0 programmed), read ICC average can be 2-2.5 times higher than a full CB (where memory cells connected to all of the word lines are programmed) for programmed word lines, it is also approximately 2 times higher. Similarly, peak ICC for OB is also approximately 2 times higher than a closed block. FIG. 14 is a plot of current consumption during a read operation of a first page (PAGE 1), a second page (PAGE 2), and a third page (PAGE 3) for an example memory apparatus with memory cells of only one word line programmed (the first word line WL0) (i.e., an open block) and memory cells of all of the word lines being programmed (i.e., closed block). As shown, the peak ICC is higher for open block. The peak occurs at during a first and second period of time of the read operation (i.e., R1/R2 time) and the average ICC is also higher due to higher channel current (i.e., ICELL current) from erased states. Also, ICC for OB is higher at lower temperature (LT) than at higher temperature (HT). FIG. 15 is a plot of current consumption during a read operation of the first page (PAGE 1), the second page (PAGE 2), and the third page (PAGE 3) for an example memory apparatuses with memory cells of only one word line programmed (the first word line WL0) (i.e., an open block), memory cells of word lines WL0-WL40 programmed, memory cells of word lines WL0-WL80 programmed, memory cells of word lines WL0-WL120 programmed, and memory cells of all of the word lines being programmed (i.e., closed block). As shown, the current consumption peak goes down with less and less openness (i.e., with more of the word lines connected to memory cells that are programmed).

FIG. 16 is a plot of current consumption during a read operation of the first page (PAGE 1), the second page (PAGE 2), and the third page (PAGE 3) for an example memory apparatus with memory cells of only one word line programmed (i.e., an open block) using a first sequence for the read operation and using a second sequence for the read operation. Specifically, in the first sequence (indicated as POR), the memory cells are erased, the memory cells connected the first word line WL0 are programmed and then the first page (PAGE 1), the second page (PAGE 2), and the third page (PAGE 3) are read one after another. In the first sequence (indicated as 1st Read), the memory cells are erased, the memory cells connected the first word line WL0 are programmed, a steady state voltage (VSS) is applied to the word lines for 1 second, then the first page is read, the steady state voltage is applied to the word lines for 1 second, the second page is read, the steady state voltage is applied to the word lines for 1 second, the third page is read. The second sequence is intended to cause the memory cells to be in the first read condition (i.e., first read stress). As shown, there is a relatively high ICC peak due to the first read condition. With the first read stress, all pages show the ICC peak at R1/R2. So, the higher ICC is due to the first read condition or issue and as discussed above, this can be suppressed by adding a dummy read operation at the end of the program operation. FIG. 17 is a plot of current consumption during a read operation of the first page (PAGE 1), the second page (PAGE 2), and the third page (PAGE 3) for an example memory apparatus with memory cells of only one word line programmed (the first word line WL0) (i.e., an open block), memory cells of only one word line programmed (the first word line WL0) using a dummy read operation, and memory cells of all of the word lines being programmed (i.e., closed block). The high ICC peak for the open block is suppressed using the dummy read operation. However, adding a dummy read operation increases program time tPROG by approximately 3%. FIG. 18 is a plot of current consumption during a read operation of a bottom word line (i.e., the first word line WL0), a middle word line, and a top word line of a block for an example memory apparatus with memory cells of only one word line programmed (the first word line WL0) (i.e., an open block) without a dummy read operation and with memory cells of only one word line programmed (the first word line WL0) using a dummy read operation. Yet, as more and more of the word lines are programmed (i.e., openness getting less and less), this current consumption peak due to the first read condition is suppressed as well.

Consequently, described herein is a memory apparatus (e.g., memory device 100 in FIGS. 1A and 2) including memory cells (e.g., memory cell 200 in FIG. 1B) each connected to one of a plurality of word lines (e.g., WLL0-WLL10 in FIG. 4) and configured to retain a threshold voltage corresponding to one of a plurality of data states (e.g., "Er", "A", "B", "C", "D", "E", "F" and "G" in FIG. 8C). The memory cells are operable in one of a first read condition in which a word line voltage of the plurality of word lines is discharged and a second read condition in which the word line voltage of the plurality of word lines is coupled up to a residual voltage level. The memory apparatus also includes a control means (e.g., control circuitry 110, controller 122, decoders 124, 132, read/write circuits 128, and sense blocks 51-53 in FIGS. 1A and 2) coupled to the plurality of word lines. The control means is configured to program the memory cells in a program operation. Following programming of the memory cells connected to specific ones of the plurality of word lines, the control means is also configured to apply a predetermined dummy read voltage to the specific ones of the plurality of word lines during a dummy read operation to maintain the memory cells connected thereto in the second read condition, the specific ones of the plurality of word lines determined based on an amount of the memory cells that are programmed.

Referring back to FIGS. 7A and 7B, for example, the memory cells are disposed in memory holes (e.g., NAND strings 700 n, 701 n, 702 n and 703 n of FIG. 7A) grouped into a plurality of blocks (e.g., blocks BLK0, BLK1, BLK2 and BLK2 of FIG. 7B). So, according to an aspect, the control means is further configured to determine the specific ones of the plurality of word lines based on a quantity of the plurality of word lines connected to the memory cells of each of the plurality of blocks that are programmed. In more detail and according to another aspect, the control means is further configured to determine to which of a plurality of predetermined word line ranges (e.g., WL0-WL10, WL0-WL30, WL0-WL50, etc.) each of the plurality of word lines being programmed belongs. The control means is also configured to identify one of the plurality of word lines being programmed as one of the specific ones of the plurality of word lines based on which of the plurality of predetermined word line ranges the one of the plurality of word lines being programmed belongs. For example, if the plurality of predetermined word line ranges includes WL0-WL10, WL0-WL30, and WL0-WL50, word line WL10 would belong to all three of the plurality of predetermined word line ranges, while WL49 would only belong to the WL0-WL50 range.

According to a further aspect of the disclosure, the memory apparatus includes a predetermined word line range parameter stored in the memory apparatus for each of the plurality of predetermined word line ranges. The predetermined word line range parameter indicates whether the dummy read operation should be performed. FIG. 19 shows an example predetermined word line range parameter. So, the control means is further configured to determine whether the dummy read operation should be performed for the one of the plurality of word lines being programmed based on the predetermined word line range parameter. Since the addition of the dummy read operation after programming each of the plurality of word lines will cause program time tPROG performance loss, it is advantageous to add the dummy read operation on selective word lines depending on the open-ness. For example, when word line WL0 is programmed, the dummy read operation can be added, while if word line WL80 is programmed, the dummy read operation can be skipped, because the peak ICC is already lower. So, the predetermined word line range parameter can be used to select the word lines that will include a dummy read operation, while it will be skipped for the rest. This way, the full program time tPROG penalty for adding the dummy read operation after every word line being programmed will not be realized.

As discussed above, the memory cells are programmed according to a predetermined order of the plurality of word lines. Thus, according to an aspect, the control means is further configured to skip the dummy read operation for ones of the plurality of word lines connected to the memory cells being programmed later in the predetermined order. For example, if word line WL0 is programmed first, the dummy read operation might be skipped for word lines programmed later than word line WL80. According to an aspect, the memory cells are disposed in memory holes grouped into a plurality of blocks (e.g., blocks BLK0-BLK3 of FIG. 7B). Referring back to FIG. 4, for example, the plurality of word lines (e.g., word line layers (word lines) WLL0-WLL10) and a plurality of dielectric layers (e.g., DL0-DL19) extend horizontally and overlay one another in an alternating fashion in a stack (e.g., stack 616). The memory holes (e.g., NAND strings NS1 and NS2) extend vertically through the stack. The memory cells are connected in series between a drain-side select gate SGD transistor (e.g., at SGD0 or SGD1 layers) on a drain-side of each of the plurality of memory holes and a source-side select gate transistor (e.g., at SGS0 or SGS1 layers) on a source-side of each of the plurality of memory holes. The drain-side select gate SGD transistor of each of the plurality of memory holes is connected to one of the plurality of bit lines (e.g., BL0) and the source-side select gate transistor of each of the plurality of memory holes is connected to a source line (e.g., SL). So, according to another aspect, control means is further configured to perform the dummy read operation based on a vertical height of each of the plurality of word lines in the stack.

Still referring to FIG. 4, for example, the plurality of word lines includes a top word line (e.g., word line layer WLL10) adjacent the drain-side select gate transistor and a bottom word line (e.g., word line layer WLL0) adjacent the source-side select gate transistor. According to an aspect, the memory cells connected to the bottom word line are programmed first and the memory cells connected to the top word line are programmed last. So, in such an arrangement, the control means is further configured to perform the dummy read operation for a first group of one of the plurality of word lines being relatively closer to and including the bottom word line and skip the dummy read operation for a second group of one of the plurality of word lines being relatively closer to and including the top word line.

Now referring to FIG. 20, a method of operating a memory apparatus is also provided. As discussed above, the memory apparatus (e.g., memory device 100 in FIGS. 1A and 2) includes memory cells (e.g., memory cell 200 in FIG. 1B) each connected to one of a plurality of word lines (e.g., WLL0-WLL10 in FIG. 4) and configured to retain a threshold voltage corresponding to one of a plurality of data states (e.g., "Er", "A", "B", "C", "D", "E", "F" and "G" in FIG. 8C). The memory cells are operable in one of a first read condition in which a word line voltage of the plurality of word lines is discharged and a second read condition in which the word line voltage of the plurality of word lines is coupled up to a residual voltage level. So, the method includes the step of 2000 programming the memory cells in a program operation. The method also includes the step of 2002 following programming of the memory cells connected to specific ones of the plurality of word lines, applying a predetermined dummy read voltage to the specific ones of the plurality of word lines during a dummy read operation to maintain the memory cells connected thereto in the second read condition, the specific ones of the plurality of word lines determined based on an amount of the memory cells that are programmed.

Again, referring back to FIGS. 7A and 7B, for example, the memory cells are disposed in memory holes (e.g., NAND strings 700 *n*, 701 *n*, 702 *n* and 703 *n* of FIG. 7A) grouped into a plurality of blocks (e.g., blocks BLK0, BLK1, BLK2 and BLK2 of FIG. 7B). So, according to an aspect, the method further includes the step of determining the specific ones of the plurality of word lines based on a quantity of the plurality of word lines connected to the memory cells of each of the plurality of blocks that are programmed. More specifically and according to another aspect, the method further includes the step of determining to which of a plurality of predetermined word line ranges (e.g., WL0-WL10, WL0-WL30, WL0-WL50, etc.) each of the plurality of word lines being programmed belongs. The method also includes the step of identifying one of the plurality of word lines being programmed as one of the specific ones of the plurality of word lines based on which of the plurality of predetermined word line ranges the one of the plurality of word lines being programmed belongs.

According to another aspect and referring back to FIG. 19, the memory apparatus includes a predetermined word line range parameter stored in the memory apparatus for each of the plurality of predetermined word line ranges. The predetermined word line range parameter indicates whether the dummy read operation should be performed. So, the method further includes the step of determining whether the dummy read operation should be performed for the one of the plurality of word lines being programmed based on the predetermined word line range parameter.

Again, as discussed, the memory cells are programmed according to a predetermined order of the plurality of word lines. Therefore, according to an aspect, the method further includes the step of skipping the dummy read operation for ones of the plurality of word lines connected to the memory cells being programmed later in the predetermined order. As above, the memory cells can be disposed in memory holes grouped into a plurality of blocks (e.g., blocks BLK0-BLK3 of FIG. 7B). Again, referring back to FIG. 4, for example, the plurality of word lines (e.g., word line layers (word lines) WLL0-WLL10) and a plurality of dielectric layers (e.g., DL0-DL19) extend horizontally and overlay one another in an alternating fashion in a stack (e.g., stack 616). The memory holes (e.g., NAND strings NS1 and NS2) extend vertically through the stack. The memory cells are connected in series between a drain-side select gate SGD transistor (e.g., at SGD0 or SGD1 layers) on a drain-side of each of the plurality of memory holes and a source-side select gate transistor (e.g., at SGS0 or SGS1 layers) on a source-side of each of the plurality of memory holes. The drain-side select gate SGD transistor of each of the plurality of memory holes is connected to one of the plurality of bit lines (e.g., BL0) and the source-side select gate transistor of each of the plurality of memory holes is connected to a source line (e.g., SL). Thus, according to another aspect, the method further includes the step of performing the dummy read operation based on a vertical height of each of the plurality of word lines in the stack.

Continuing to refer to FIG. 4, for example, the plurality of word lines includes a top word line (e.g., word line layer WLL10) adjacent the drain-side select gate transistor and a bottom word line (e.g., word line layer WLL0) adjacent the source-side select gate transistor. Again, according to an aspect, the memory cells connected to the bottom word line are programmed first and the memory cells connected to the top word line are programmed last. Therefore, in such an arrangement, the method further includes the step of performing the dummy read operation for a first group of one of the plurality of word lines being relatively closer to and including the bottom word line and skip the dummy read operation for a second group of one of the plurality of word lines being relatively closer to and including the top word line.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:
1. A memory apparatus, comprising:
a plurality of blocks including memory cells that are disposed in memory holes and are each connected to one of a plurality of word lines and configured to retain a threshold voltage corresponding to one of a plurality of data states and being operable in one of a first read condition in which a word line voltage of the plurality of word lines is discharged and a second read condition in which the word line voltage of the plurality of word lines is coupled up to a residual voltage level; and
a control means coupled to the plurality of word lines and configured to:
program the memory cells in a program operation,

determine specific ones of the plurality of word lines of the plurality of blocks based on a quantity of the plurality of word lines connected to the memory cells of each of the plurality of blocks that are programmed;
following programming of the memory cells connected to the specific ones of the plurality of word lines, apply a predetermined dummy read voltage to the specific ones of the plurality of word lines during a dummy read operation to maintain the memory cells connected thereto in the second read condition, the specific ones of the plurality of word lines determined based on an amount of the memory cells that are programmed.
2. The memory apparatus as set forth in claim 1, wherein the control means is further configured to:
determine to which of a plurality of predetermined word line ranges each of the plurality of word lines being programmed belongs; and
identify one of the plurality of word lines being programmed as one of the specific ones of the plurality of word lines based on which of the plurality of predetermined word line ranges the one of the plurality of word lines being programmed belongs.
3. The memory apparatus as set forth in claim 2, further including a predetermined word line range parameter stored in the memory apparatus for each of the plurality of predetermined word line ranges, the predetermined word line range parameter indicates whether the dummy read operation should be performed, and the control means is further configured to determine whether the dummy read operation should be performed for the one of the plurality of word lines being programmed based on the predetermined word line range parameter.
4. The memory apparatus as set forth in claim 1, wherein the memory cells are programmed according to a predetermined order of the plurality of word lines and the control means is further configured to skip the dummy read operation for ones of the plurality of word lines connected to the memory cells being programmed later in the predetermined order.
5. The memory apparatus as set forth in claim 1, wherein the plurality of word lines and a plurality of dielectric layers extend horizontally and overlay one another in an alternating fashion in a stack, the memory holes extend vertically through the stack, the memory cells are connected in series between a drain-side select gate transistor on a drain-side of each of the memory holes and a source-side select gate transistor on a source-side of each of the memory holes, the drain-side select gate transistor of each of the memory holes is connected to one of a plurality of bit lines and the source-side select gate transistor of each of the memory holes is connected to a source line, and the control means is further configured to perform the dummy read operation based on a vertical height of each of the plurality of word lines in the stack.
6. The memory apparatus as set forth in claim 5, wherein the plurality of word lines includes a top word line adjacent the drain-side select gate transistor and a bottom word line adjacent the source-side select gate transistor, the memory cells connected to the bottom word line are programmed first and the memory cells connected to the top word line are programmed last and the control means is further configured to perform the dummy read operation for a first group of one of the plurality of word lines being relatively closer to and including the bottom word line and skip the dummy read operation for a second group of one of the plurality of word lines being relatively closer to and including the top word line.

7. A controller in communication with a memory apparatus that has a plurality of blocks including memory cells that are disposed in memory holes and are each connected to one of a plurality of word lines and configured to retain a threshold voltage corresponding to one of a plurality of data states and being operable in one of a first read condition in which a word line voltage of the plurality of word lines is discharged and a second read condition in which the word line voltage of the plurality of word lines is coupled up to a residual voltage level, the controller configured to:

instruct the memory apparatus to program the memory cells in a program operation;

determine specific ones of the plurality of word lines based on a quantity of the plurality of word lines connected to the memory cells of each of the plurality of blocks that are programmed;

following programming of the memory cells connected to the specific ones of the plurality of word lines, instruct the memory apparatus to apply a predetermined dummy read voltage to the specific ones of the plurality of word lines during a dummy read operation to maintain the memory cells connected thereto in the second read condition, the specific ones of the plurality of word lines determined based on an amount of the memory cells that are programmed.

8. The controller as set forth in claim 7, wherein the controller is further configured to:

determine to which of a plurality of predetermined word line ranges each of the plurality of word lines being programmed belongs; and identify one of the plurality of word lines being programmed as one of the specific ones of the plurality of word lines based on which of the plurality of predetermined word line ranges the one of the plurality of word lines being programmed belongs.

9. The controller as set forth in claim 7, wherein the memory cells are programmed according to a predetermined order of the plurality of word lines and the controller is further configured to instruct the memory apparatus to skip the dummy read operation for ones of the plurality of word lines connected to the memory cells being programmed later in the predetermined order.

10. The controller as set forth in claim 7, wherein the plurality of word lines and a plurality of dielectric layers extend horizontally and overlay one another in an alternating fashion in a stack, the memory holes extend vertically through the stack, the memory cells are connected in series between a drain-side select gate transistor on a drain-side of each of the memory holes and a source-side select gate transistor on a source-side of each of the memory holes, the drain-side select gate transistor of each of the memory holes is connected to one of a plurality of bit lines and the source-side select gate transistor of each of the memory holes is connected to a source line, and the controller is further configured to instruct the memory apparatus to perform the dummy read operation based on a vertical height of each of the plurality of word lines in the stack.

11. The controller as set forth in claim 10, wherein the plurality of word lines includes a top word line adjacent the drain-side select gate transistor and a bottom word line adjacent the source-side select gate transistor, the memory cells connected to the bottom word line are programmed first and the memory cells connected to the top word line are programmed last and the controller is further configured to instruct the memory apparatus to perform the dummy read operation for a first group of one of the plurality of word lines being relatively closer to and including the bottom word line and skip the dummy read operation for a second group of one of the plurality of word lines being relatively closer to and including the top word line.

12. A method of operating a memory apparatus including a plurality of blocks with memory cells that are disposed in memory holes and are each connected to one of a plurality of word lines and configured to retain a threshold voltage corresponding to one of a plurality of data states and being operable in one of a first read condition in which a word line voltage of the plurality of word lines is discharged and a second read condition in which the word line voltage of the plurality of word lines is coupled up to a residual voltage level, the method comprising the steps of:

programming the memory cells in a program operation;

determine specific ones of the plurality of word lines based on a quantity of the plurality of word lines connected to the memory cells of each of the plurality of blocks that are programmed; and following programming of the memory cells connected to the specific ones of the plurality of word lines, applying a predetermined dummy read voltage to the specific ones of the plurality of word lines during a dummy read operation to maintain the memory cells connected thereto in the second read condition, the specific ones of the plurality of word lines determined based on an amount of the memory cells that are programmed.

13. The method as set forth in claim 12, further including the steps of:

determining to which of a plurality of predetermined word line ranges each of the plurality of word lines being programmed belongs; and identifying one of the plurality of word lines being programmed as one of the specific ones of the plurality of word lines based on which of the plurality of predetermined word line ranges the one of the plurality of word lines being programmed belongs.

14. The method as set forth in claim 13, wherein the memory apparatus further includes a predetermined word line range parameter stored in the memory apparatus for each of the plurality of predetermined word line ranges, the predetermined word line range parameter indicates whether the dummy read operation should be performed, and the method further includes the step of determining whether the dummy read operation should be performed for the one of the plurality of word lines being programmed based on the predetermined word line range parameter.

15. The method as set forth in claim 12, wherein the memory cells are programmed according to a predetermined order of the plurality of word lines and the method further includes the step of skipping the dummy read operation for ones of the plurality of word lines connected to the memory cells being programmed later in the predetermined order.

16. The method as set forth in claim 12, wherein the plurality of word lines and a plurality of dielectric layers extend horizontally and overlay one another in an alternating fashion in a stack, the memory holes extend vertically through the stack, the memory cells are connected in series between a drain-side select gate transistor on a drain-side of each of the memory holes and a source-side select gate transistor on a source-side of each of the memory holes, the drain-side select gate transistor of each of the memory holes is connected to one of a plurality of bit lines and the source-side select gate transistor of each of the memory holes is connected to a source line, and the method further includes the step of performing the dummy read operation based on a vertical height of each of the plurality of word lines in the stack.

17. The method as set forth in claim 16, wherein the plurality of word lines includes a top word line adjacent the drain-side select gate transistor and a bottom word line adjacent the source-side select gate transistor, the memory cells connected to the bottom word line are programmed first and the memory cells connected to the top word line are programmed last and the method further includes the step of performing the dummy read operation for a first group of one of the plurality of word lines being relatively closer to and including the bottom word line and skip the dummy read operation for a second group of one of the plurality of word lines being relatively closer to and including the top word line.

\* \* \* \* \*

36